SYSTEM FOR READING, RECORDING AND RESETTING REGISTERED DATA

Filed Aug. 21, 1964 7 Sheets-Sheet 1

INVENTORS.
DONALD J. COLLOM
CHARLES G. MANN
BY
Marshall, Wilson & Yeasting
attorneys

SYSTEM FOR READING, RECORDING AND RESETTING REGISTERED DATA

Filed Aug. 21, 1964

INVENTORS
DONALD J. COLLOM
CHARLES G. MANN
BY Marshall, Wilson & Yeasting
-attorneys- INVENTORS
DONALD J. COLLOM
CHARLES G. MANN
BY Marshall, Wilson & Yeasting
attorneys INVENTORS.
DONALD J. COLLOM
CHARLES G. MANN
BY Marshall, Wilson & Yeasting
-attorneys- INVENTORS.
DONALD J. COLLOM
CHARLES G. MANN
BY Marshall, Wilson & Yeasting
- attorneys -

INVENTORS,
DONALD J. COLLOM
CHARLES G. MANN
BY Marshall, Wilson & Yeasting
attorneys INVENTORS.
DONALD J. COLLOM
CHARLES G. MANN
BY Marshall, Wilson & Yeasting
-attorneys- United States Patent Office 3,372,379

Patented Mar. 5, 1968

3,372,379

SYSTEM FOR READING, RECORDING AND RESETTING REGISTERED DATA

Donald J. Collom, Birmingham, and Charles G. Mann, Farmington, Mich., assignors to Weltronic Company, Southfield, Mich., a corporation of Michigan Filed Aug. 21, 1964, Ser. No. 391,084
21 Claims. (Cl. 340—172.5)

ABSTRACT OF THE DISCLOSURE

A system for reading, storing and recording information accumulated in one or more registers and for verifying the read, stored or recorded values by applying and advancing signal to each register which causes an advance according to the read, stored or recorded value. The advance signal is of a value which advances the register from its present setting to a predetermined reset value, usually zero. The failure to return any register to the predetermined reset value indicates a malfunction in the sequence, while return of all registered to the respective predetermined reset values verifies the read, stored or recorded value, whichever is used as the basis for establishing the reset signal.

This invention relates to apparatus for and methods of reading information, storing information, recording information and resetting the source of such information.

Heretofore it has been known to accumulate information and record that information in suitable means for such storage. Further, it has been known to read the accumulated information into a storage means from which it is recorded. Frequently economy dictates that a single recording mechanism be employed for information in a large number of accumulators. Such transfer from plural accumulators may also be accomplished by a single storage mechanism. Rapid clearing of information in the accumulators and storage or recording thereof frequently is essential and imposes limitations on equipment utilization due to the limited time available for such operations. For example, when production information obtained by monitoring a plurality of work stations is to be stored and recorded, only that time when the work stations are not in operation, as the period between the end of the preceding work period and the beginning of the next work period, is available for the storing and recording operations. Accordingly, the number of work stations for which information can be stored and/or recorded during a given work break depends upon the speed with which the accumulators for each work station can be read, and the information transferred to the storage medium.

In accordance with the above, it is an object of this invention to improve systems for reading, storing and recording information.

Another object is to increase the speed with which information is stored and recorded.

A third object is to improve the reliability of information storage and recording, particularly by verifying the stored or recorded information against the source of such information.

Another object is to achieve the aforenoted objects with simple equipment of relatively low first cost and ease of maintenance.

A fifth object is to facilitate the resetting of information storing devices.

One feature of this invention enabling the achievement of the above objects is a system simultaneously reading the information in a plurality of accumulators, simultaneously storing said information and simultaneously applying said information to a recording means.

Another feature resides in resetting the accumulators according to the information introduced into the storage by the accumulators.

A third feature involves utilizing the reset of the accumulators to verify the information retained in the storage equipment.

A fourth feature resides in the use of a pulse signal generator together with counting, sequencing and gating circuits to drive the information accumulators through a read-storage cycle and a reset cycle.

Another feature comprises resetting the memory or storage mechanism only after the recorded information has been verified with respect to the information in that mechanism.

The above features have been embodied for illustrative purposes in a production monitoring system for a plant in which a number of working stations are monitored for the number of pieces produced, the number of units produced, the down time and the production time. Such information is of value to the production control department and the payroll department and accordingly it is frequently recorded several times together with supplemental information identifying the work station, product run, date, work shift, employee, rate classification and the like for the benefit of the interested departments. The system to which the invention has been applied involved twenty-five monitored work stations each having from one to six employees assigned to the station. The system causes a card to be punched for each operative work station and for each employee assigned to each work station according to a manual actuation of read-transfer controls, or by a programmed actuation, as by a clock controlled programmer. Individual work stations are also arranged for read-transfer actuation by manual controls on their central station display panels.

Read-transfer operations ordinarily are accomplished between shifts. In a system requiring several hundred record cards to provide the information desired, rapid production of those cards is essential. The present invention is concerned with the high speed readout of information into storage media such as punched cards and the resetting of the information accumulators. A related patent application is directed to the sequencing of the readout, recording and resetting of a large number of information sources such as the system mentioned.

In general the method of readout is applicable to information accumulators having separate stages individually driven. Thus in the case of decade registers having display wheels, each wheel is arranged to count 0 through 9 and is provided with an individual driving means such as a stepping solenoid and ratchet drive. Readout is accomplished from such devices by driving them through one full cycle, as by application of ten pulses to a decade register and marking the arrival of the accumulator at some predetermined point in accordance with the amount of the driving cycle required to advance them to that point. In the case of a decade counter wheel, this could involve applying ten advancing pulses to the drive mechanism of the wheel and sensing the number of pulses required to advance the wheel from its accumulated count to the nine count position. Thus for a count of three, six pulses would advance the counter wheel to nine at which point a storage device would remember the count of six and the four remaining pulses of the cycle would return the wheel to the three count position.

Coincidence of the marker position and a given portion of the read cycle is stored as by an electrical memory. In the example above the closing of a ninth count contact on the register completes a circuit through certain relay combinations set up in a binary code from a counter to energize that coded combination of relays enabled at the count for which the ninth count contact is closed. Thus, since six counts were required to advance the counter to its ninth count position, the relays representing the binary six are energized and sealed in. These memory relays are arranged to establish contact combinations in a matrix whereby a visual indication of the count in the memory is displayed as on Nixie tubes.

Recording of the count is accomplished by the conditioning of the recording mechanism by the memory relays. Appropriate punches are enabled in a card punch machine recorder in the exemplary system. Once the card has been punched and verified in the card punching machine, the accumulators or registers are reset according to the information stored in the memory. Thus if a memory relay code combination of six is energized, it is indicative of the need of seven advancing pulses to the register to reset it from three to zero. The combined memory relays for six are arranged to apply the appropriate number of pulses to the register to return it to zero. In the event it is not returned to zero the system is interlocked to indicate a failure to verify the readout and memory or reset and an interlock is actuated requiring some action to clear the trouble.

In practice a plurality of digits are read, stored, recorded, and reset in simultaneous operations. The pulse generating mechanism provides sufficient power to actuate a group of digit register drive mechanisms simultaneously and the counter enables a binary coded relay group for each digit simultaneously in the readout process. The punch card machine is arranged to punch all digits of like value simultaneously and thus cycles through ten discrete punching steps. When recording is completed and has been verified, all digit registers are reset simultaneously each by pulses derived from its energized memory relay combination. Under this type of operation verification requires that all registers in a group be at zero when the reset cycle is completed.

Further details of the invention together with the above features and objects will be set forth in the following detailed description which should be read with reference to the accompanying drawings in which.

Figure 3:
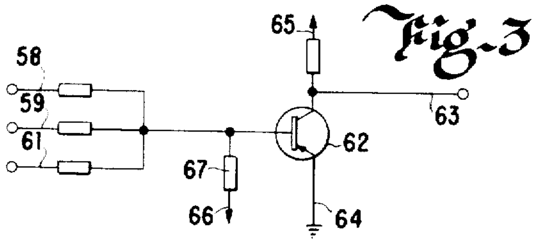
FIGS. 3 through 8 are schematic circuit digrams of logic circuits typical of those utilized in the illustrative embodiment of a system of this invention, comprising respectively a "nor" circuit, a memory circuit having a trigger, a memory circuit having two "off" inputs, a timer, an "or" output amplifier circuit, and a "nor" output amplifier.
Figure 3A:
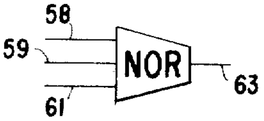
Figure 11:
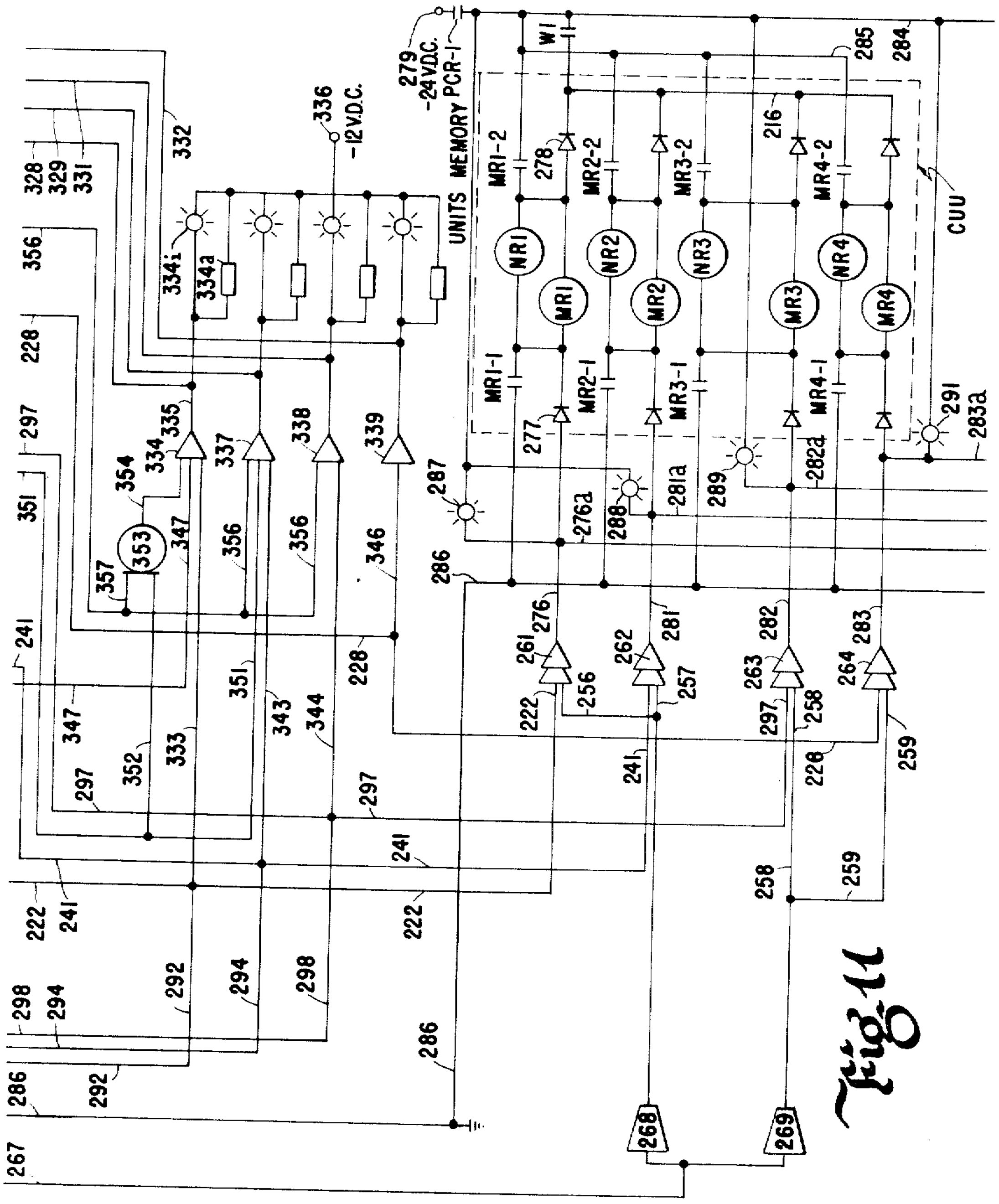
Figure 12:
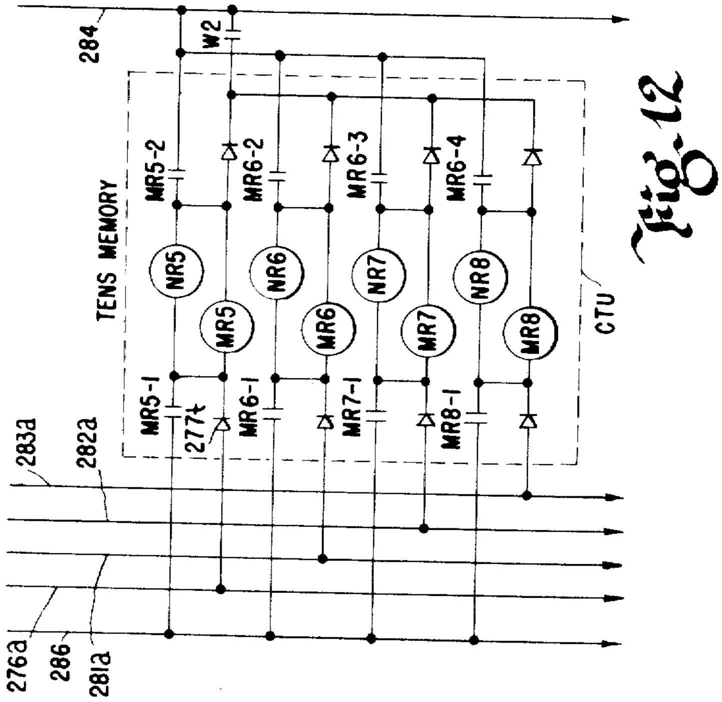
Figure 13:
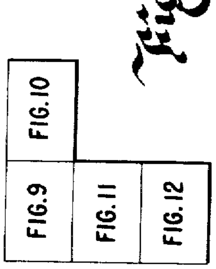
Figure 14:
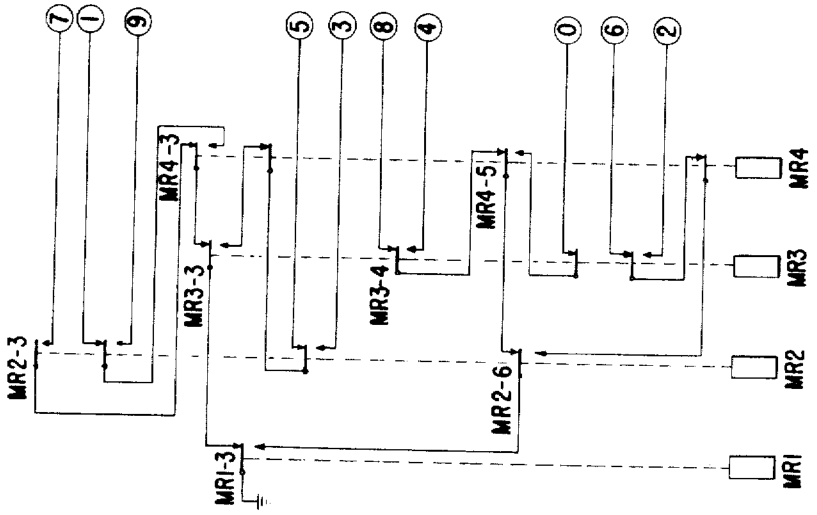
Figure 15:
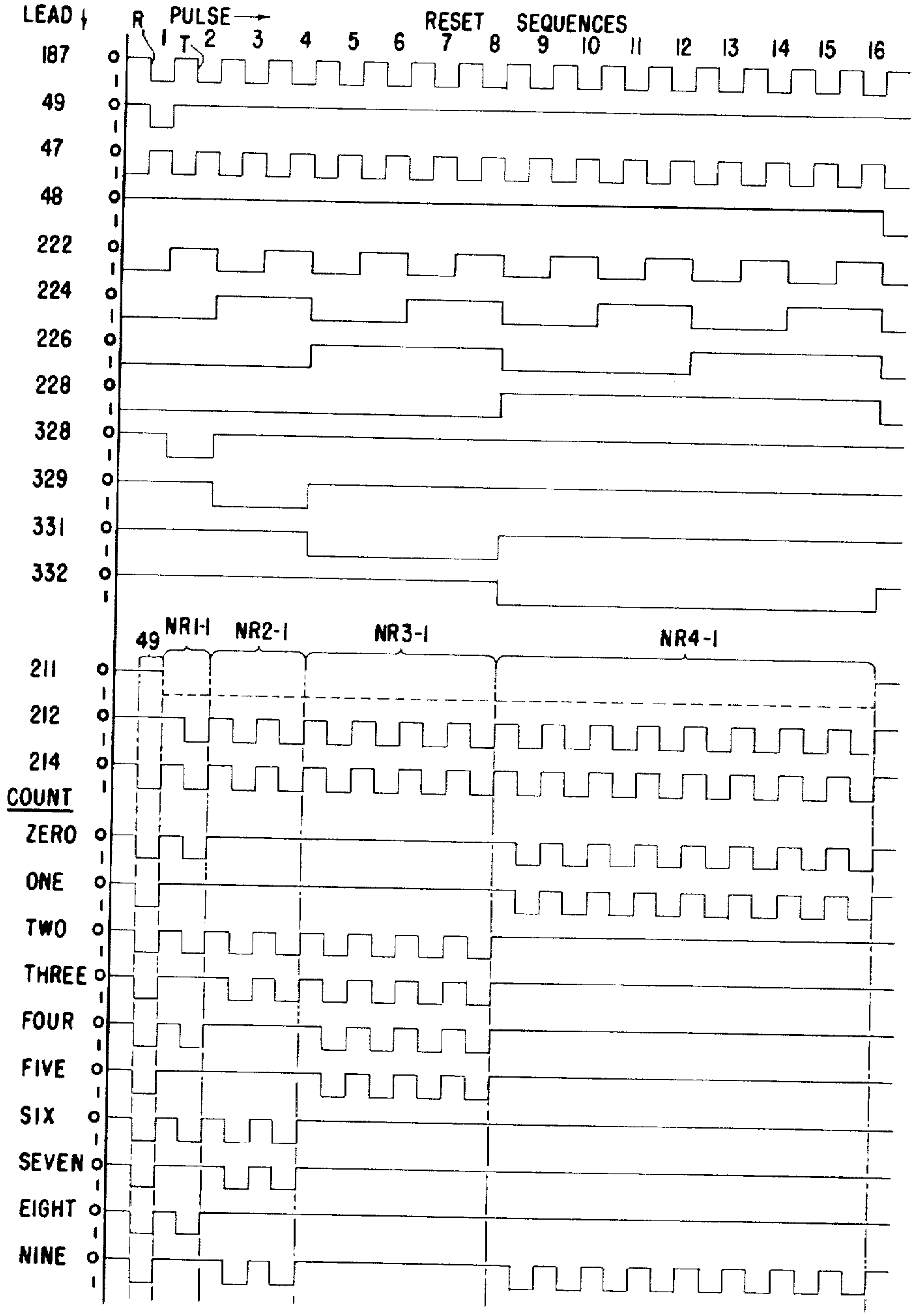

FIGS. 3*a*, *b* and *c* and 4*a* through 8*a* are the logic symbols applicable to the circuits of FIGS. 3 through 8 as employed in the system disclosure; and FIGS. 9, 10, 11 and 12 are the logic circuit diagrams for one system according to this invention arranged so that the diagrams are to be placed adjacent each other in the pattern set forth in FIG. 13 to portray the relationship of the several elements. It is to be appreciated that only typical elements of the systems are set forth in FIGS. 9 through 12 and that in the actual system certain of the elements are duplicated to a greater extent than there illustrated;

FIG. 14 illustrates the relay contact matrix employed to convert from a binary code as established in the read-store cycle to the decimal code of the record and storage count display functions; and FIG. 15 is a diagram of the signal sequences for certain portions of the system during the register reset cycle and illustrating the combinations employed to achieve the reset pulse trains corresponding to the complement of the count in the registers.

The present invention will be illustrated as applied to a production monitoring system of the general type disclosed in Charles G. Mann, United States patent application Ser. No. 109,898, filed May 15, 1961 and entitled "Production Monitoring Systems" now Patent 3,275,987 which issued Sept. 27, 1966. As is typical of such systems, in the example production data is accumulated upon a electromagnetically actuated registers. A display panel 21 such as might be located at a central monitoring station is disclosed in FIG. 1 to illustrate typical parameters to be monitored. In the example signal lamps 22 are controlled by call indicators (not shown) manually actuated from the work station being monitored to indicate by code combinations needs or conditions at the work station. Assignment of the work station to a given condition such as "set up," "down time" or "production" can be controlled by an assigment selector switch 23 on the panel 21. A group of predetermined programs can be assigned to the machine by means of a switch 24 on the panel having a display window 25 to indicate the program in effect. These programs determine the appropriate time for a read-transfer operation according to this invention, as at the end of the shift or at the noon work break. Production data is displayed on the panel by registers 26, 27, 28, 29 and 30 which respectively represent the number of units processed at the work station in a four digit register, the number of pieces processed in a four digit register, the time the work station has operated on production in hours and hundredths of hours, the time the work station has been down in hours and hundredths of hours, and a descending register which can be actuated selectively for either time or units as determined by switch 31 to indicate the balance of either time or units remaining in a predetermined run as set up at the beginning of the run by set wheel 32.

The read-transfer operations and equipment of this invention are arranged to respond to either program clock controls or to the manual actuation of a switch 33 on the face of the panel 21 to read out the quantities set on the units, pieces, run and down registers 26, 27, 28 and 29 by the operations at the work station. In order to facilitate such read out, the register for each quantity is made up of individual digit registers. Each digit register includes a display wheel bearing ten digits 0 through 9, and a drive train which is cocked by the energization of a solenoid and advanced by the drop out of an armature upon deenergization of the solenoid. In order to accumulate from decade to decade, each register is provided with a contact which is closed by the ninth count to energize the solenoid of the register for the next higher decade so that upon energization of a register to advance from the ninth to the tenth count the register solenoid for the next decade will also be energized and upon deenergization will be advanced as the first register wheel advances to zero.

Figure 10:
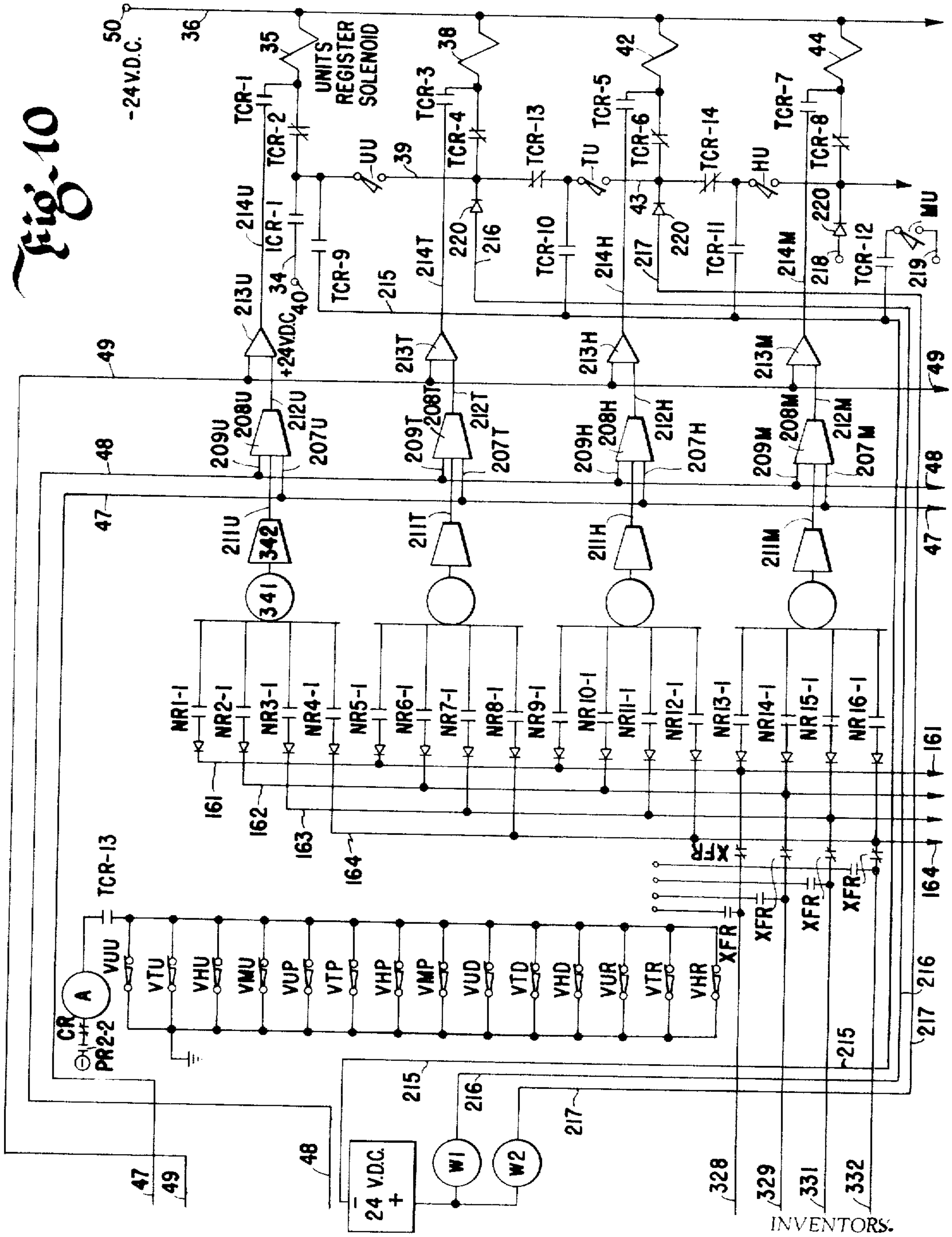

Register circuits for the production units monitored at a work station are illustrated in FIG. 10. These circuits respond to a sensing device at the work station (not shown) such as a microswitch actuated by the reciprocation of a press head to energize a units count relay 1CR (not shown) and complete a circuit for energizing units register, units decade solenoid 35 from a suitable source of positive potential, e.g., plus 24 volts D.C., (not shown) through terminal 40, lead 34, units count relay contact 1CR–1, and transfer control relay contact TCR–2, to lead 36 and a suitable negative potential, e.g. minus 24 volts D.C., (not shown) at terminal 50.

Each closure of the microswitch energizes solenoid 35 and, when opened to drop the register armature (not shown), advances units decade display wheel 37 one count. At the advance of wheel 37 to the ninth count display position, contact UU is closed. Upon the tenth closure of the microswitch, contact 1CR–1 passes ground to solenoid 38 of the tens register for production units through contact UU, lead 39 and back contact TCR–4 of the transfer relay. The opening of contact 1CR–1 then advances the units and tens registers. On the hundredth closure of contact 1CR–1, ground is passed to the hundreds solenoid 42 from lead 34, through contacts 1CR–1 and UU, lead 39, contacts TCR–13 and TU, lead 43 and back contact TCR–6, so that each of solenoids 35, 38 and 42 are simultaneously energized. When contact 1CR–1 opens, these solenoids are dropped to advance the count to one hundred. Thus, each decade register when at its ninth count provides a path to the next register so that the tenth ground it receives is also passed to that next register. This sequence also enables the thousands decade solenoid 44 to be energized through the closed hundreds register ninth contact HU when contact 1CR–1 is closed and the count is "999." While only four decades are illustrated for registration of production units, it is to be appreciated that the system could be expanded to additional decades in the manner described. Further, as will be explained below the ninth position contacts for each register are utilized in the readout and reset of the recording system of this invention.

In order to read, record and reset the information in the registers of group 26, 27, 28 and 29 fourteen solenoids must be actuated. Thus in addition to the four solenoids 35, 38, 42 and 44 of FIG. 10 for the units count the system also includes at least four solenoids for the pieces count, three for the run time count in hundredths of hours, and three for the down time in hundredths of hours (none of which are shown). These register groups are represented in the block diagram of FIG. 2 by their functional designations. Reading of the count in the registers is accomplished by pulsing each register decade through a complete cycle and marking the number of stepping pulses required to reach a predetermined count position. In the example this is accomplished by a pulse generator 196 which when placed in operation generates sixteen pulses of such spacing and duration as to be proper for stepping the solenoids. These pulses drive a counter 198 which, through appropriate sequencing circuits 51 control a gate 52 for an output of the pulse generator. When a read-transfer signal is issued to the system the pulse generator applies its first ten pulses through gate 52 to each decade of the registers to advance those registers through a full cycle and thereafter the gate 52 by virtue of the sequencing control prevents the transmission of additional pulses.

During the advance of each decade register at some point in the cycle dependent upon the count accumulated therein at the time the cycle was initiated, the ninth count of the register is achieved and a contact is closed as at UU of FIG. 10. A memory 53 comprising four relays in the example is provided for each decade register. Each memory is enabled in a particular combination for each count to convert the count to a binary code and when the ninth position contact for the register with which it is associated is closed the coded combination of relays enabled for that count required to advance the register to nine is energized and sealed in.

Figure 2:
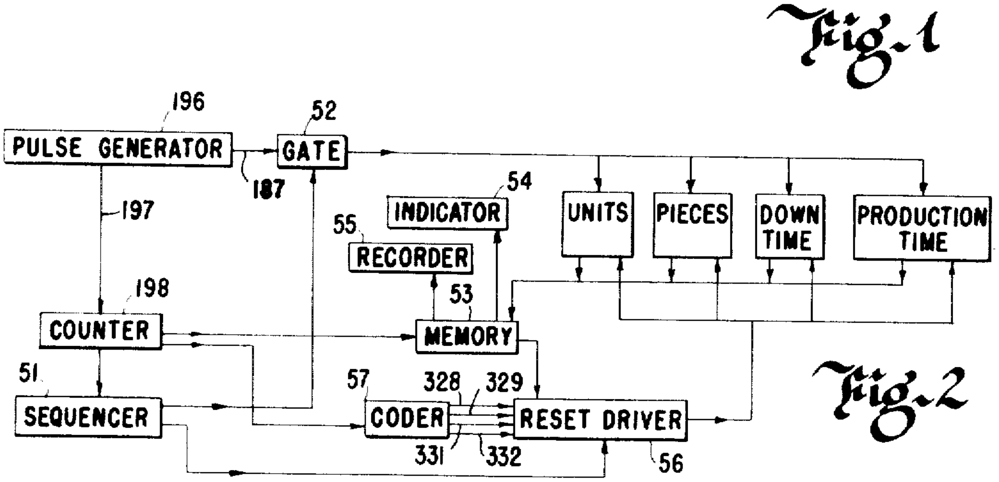
FIG. 2 is a block diagram of one system according to this invention.

The memory relays establish a visual readout of the information stored through a suitable contact matrix as shown in FIG. 14 to an indicator 54. These relays also set up circuits which enable the card punches for the recorder device 55 to be energized according to the information stored by means of a contact matrix as shown in FIG. 14, and they close appropriate reset leads to apply enabling pulses to amplifiers connected to the register driving solenoids. The actuated amplifiers are represented in FIG. 2 as reset drivers 56. The card punching machine through its emitter reads the several inputs by well known techniques, as by means of an emitter which scans the inputs for each information item, and causes the card to be punched and verified against the punch settings. Thereafter, the machine recycles the pulse generator 196 to cause it to generate sixteen pulses for resetting the registers.

Upon termination of the read pulse train from pulse generator 196, sequencer 51, in addition to disabling the pulse generator, conditioned circuits to prevent transmission of pulses by gate 52 to the registers on the next pulse train. Sequencer 51 also enables reset driver 56 for the reset pulsing cycle of pulse generator 196. During the reset pulsing cycle, pulse generator 196 applies pulses through counter 198 which transmits them through coder 57 having four output leads 328, 329, 331 and 332 respectively each including a memory relay contact for a digit in the input to the reset driver individual to the driver solenoid of the register for that digit. The reset pulse train is issued from the coder as one pulse on lead 208, two pulses on lead 209, four pulses on lead 211 and eight pulses on lead 212, all in cascade order, so that all combinations of from one to ten pulses can be obtained at the reset driver 56 depending upon which memory relay contacts in those leads are closed. Since the memory relay contacts are arranged to produce the complement of the number read from the register for each digit, each register solenoid is subjected to the number of pulses required to return it to its zero position. Verification of the read-memory and reset functions can thus be obtained by employing a contact on the registers which is opened only at the zero position in a parallel circuit to actuate an interlock circuit in the event one or more registers was not reset to zero at the end of the reset cycle. Verification of the register reset enables the reset of the memory by releasing all relays.

When fully reset the system is again capable of cycling through a read-memory cycle, a recorder cycle, a register reset cycle and a memory reset cycle.

The illustrative embodiment of the above described system will embody static machine control elements of a type which are commercially available. In order to simplify the description of the system it will be set forth in terms of "nor logic" functions. Before embarking upon the system description, a brief discussion of the details of the logic elements employed therein will be undertaken with reference to schematic circuits for the logic modules and the corresponding logic symbols therefor as employed in the system diagram.

The basis of the present system resides in circuits which respond to discrete electrical signals providing sensing and control. These signals can be either a voltage or no voltage. They are employed to perform logic and memory operations and the results are amplified to control outputs at a power level sufficient to energize electro-magnetic machine elements as relays for control of punch magnets and stepping solenoids.

In the modules transistors and other solid state components are employed. The transistor is used as a switch in the sense that it appears as a very high resistance in the "off" condition and a very low resistance in the "on" condition. In general these conditions will be termed a "logical 0" signal (zero to −0.1 volt) and a "logical 1" signal (−5 to −12 volts) in the modules and the system.

A "nor" logic circuit having three inputs 58, 59 and 61 is shown in FIG. 3. A PNP transistor 62 has the load connected between output lead 63 connected to its collector and the common emitter lead 64. Negative 12 volts D.C. are supplied to lead 65 through a load resistor. With no current flowing into the base of the transistor, a very high resistance appears between the collector and emitter terminals. To insure the maximum possible resistance presented to the external load, a positive bias of about six volts is applied to the base through lead 66 and resistor 67. Application of a negative voltage to the base of the transistor as a "logical 1" signal on any of inputs 58, 59 or 61 overcomes the positive bias and turns the transistor "on." In the conductive state it presents a very low resistance between the collector and emitter so that the load is effectively shorted to ground. Thus a "logical 0" appears at the output 63.

Figure 3B:
Figure 3C:
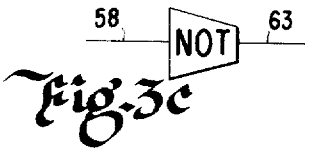

The basic "nor" circuit of FIG. 3 appears in the diagram of the system as a three input "nor" represented as shown in FIG. 3*a* wherein application of a "logical 1"

signal to any of inputs 58, 59 or 61 results in a "logical 0" output at 63. Similarly a two input "nor" is shown in FIG. 3*b* where a "logical 1" or input 58 or 59 results in a "logical 0" output at 63. Where only one input 58 is utilized a "not" result as shown in FIG. 3*c* wherein this circuit issues a "logical 0" at output 63 when a "logical 1" appears at input 58. Each of these circuits issue a "logical 1" at output 63 when all inputs receive "logical 0" signals.

Figures 4, 4A, 5, 5A, 6, 6A, 7, 7A, 8, 8A:
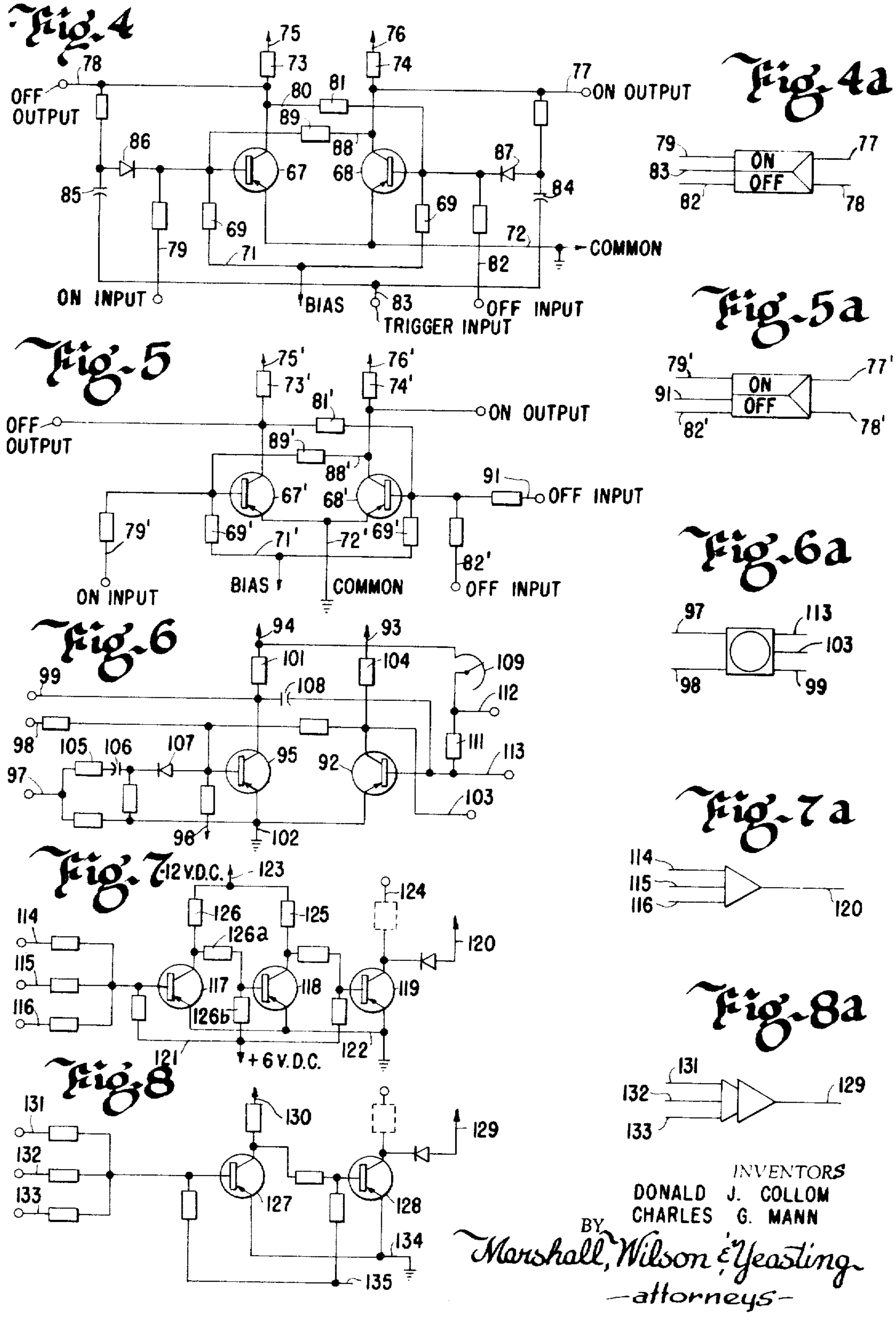

FIG. 4 portrays a "memory" made up as a flip-flop including two PNP transistors 67 and 68 each having their base biased positively by a six volt positive bias applied through resistors 69 and lead 71. The transistors have their emitters connected to common lead 72 and their collectors connected to individual sources of negative voltage (−12 volts D.C.) through resistors 73 and 74 and leads 75 and 76. The power to lead 76 is applied subsequent to that applied to lead 75 to insure an initial operating state with transistor 68 conductive and 67 non-conductive. Thus output lead 77, the "on" output, is effectively at zero potential and a "logical 0" signal issues therefrom at the outset of operation while "off" output lead 78 is effectively at −12 volts less the potential drop in the resistors and issues a "logical 1" signal. Application of a negative signal, a "logical 1," to "on" input lead 79 overcomes the positive bias on the base of transistor 67 to place it in conduction whereby the potential at "off" output lead 78 goes essentially to zero and a "logical 0" issues therefrom. This zero potential at the collector of transistor 67 is applied to the base of transistor 68 through lead 80 and resistor 81 whereby it is cutoff causing "on" output lead 77 to issue a "logical 1." The circuit can be returned to its initial state by applying a "logical 1" or negative signal to "off" or "reset" input 82 to drive the base of transistor 68 negative, initiate conduction in transistor 68; produce a positive going signal at the base of transistor 67 to terminate its conduction and as a result cause a "logical 0" at "on" output 77 and a "logical 1" at "off" output 78.

A trigger input 83 is arranged so that a pulse signal will cause the outputs 78 and 77 to change on successive inputs. A positive going signal on lead 83 tends to turn off the conducting transistor by carrying its base positive and the resulting negative going signal on coupling lead initiates conduction in the previously non-conducting transistor.

With transistor 68 conducting and 67 non-conducting the base of 68 is negative due to the coupling of lead 80, lead 77 is essentially at zero potential, and condenser 84 is essentially discharged, while lead 78 is at −12 volts less the resistance drops and condenser 85 has its electrode connected to the base of 67 through isolating rectifier 86 at −12 volts less the resistance drops. A positive going signal such as the return to zero of a negative pulse, applied to trigger input 83 will momentarily drive the base of transistor 68 positive through forward biased rectifier 87 and terminate its conduction. This signal is insufficient to forward bias rectifier 86. Hence momentarily both transistors 67 and 68 are non-conductive. Upon recovery from this positive going signal and while the coupling from the collector of 68 through lead 88 and resistor 89 to the base of 67 is going negative, transistor 67 is placed in conduction. A subsequent negative going signal on lead 83 as the leading edge of a negative pulse, again has no effect on the conduction states in the flip-flop. However, the next positive going signal on lead 83, the end of that negative pulse, again transfers conduction to turn off transistor 67 and turn on transistor 68.

The flip-flop of FIG. 5 is employed as a memory and has characteristics corresponding to that of FIG. 4 except for the absence of the trigger input 83 and the condensers, resistors and rectifiers associated therewith, and for the presence of two "off" inputs. Accordingly, the same reference characters applied to FIG. 4 are employed in FIG. 5 where elements correspond and they are primed to distinguish them from FIG. 4. The second "off" input 91 is coupled to the base of transistor 68′ in the same manner as "off" input 82′.

As employed in the diagrams of the read-transfer system the upper section of the symbols of FIG. 4*a* and 5*a* are the "on" sections and the upper input and output leads on the left and right respectively are "on" leads such that in the initial quiescent state a "logical 0" appears on the "on" output. Leads extending from the lower half of the symbol are "off" inputs and outputs. In the initial quiescent state a "logical 1" issues from the "off" output and a "logical 1" applied to the "on" input while that state prevails will invert the output states issuing a "logical 1" at the "on" output and a "logical 0" at the "off" output. Reset can be accomplished by applying a "logical 1" to any "off" input.

The trigger input for the circuit of FIG. 4 is represented by the lead to the input or left side of the symbol of FIG. 4*a* which is aligned with the line dividing the "on" and "off" sections within the rectangle.

As with the symbols of FIGS. 3*a* and 6*a* through 8*a*, certain of the input and output leads of FIGS. 4*a* and 5*a* are not shown in some utilizations of these circuit modules in the system of FIGS. 9 through 13.

FIG. 6 illustrates a timer module in the form of a one shot multivibrator. Transistor 92 is normally conducting in the initial quiescent state by virtue of the delayed minus twelve volts applied at terminal 93 subsequent to a similar voltage applied at terminal 94 for nonconducting transistor 95. A positive six volt bias applied at terminal 96 to the base of transistor 95 insures that it is nonconducting. When in the initial quiescent state with no "logical 1" signal applied to inputs 97 or 98, the output 99 will issue a "logical 1" by virtue of the absence of appreciable current from input 94 through resistor 101 and transistor 95 to common terminal 102 and output 103 will issue a "logical 0" since conductive transistor 92 will cause a substantial drop across resistor 104. A negative going signal at input 97 is passed through low resistance 105, condenser 106, and rectifier 107 to the base of 95 to cause it to become conductive. This drives the base of 92 positive through coupling condenser 108 to terminate conduction in 92. As a result a "logical 0" appears at output 99 and a "logical 1" at output 103 until the circuit restores to its initial state. Restoration occurs an interval following triggering which depends upon the capacitance of condenser 108 and the resistance betwen the base for 92 and the voltage source at 94, and thus, upon the setting of rheostat 109 and the value of resistor 111. External adjustment of these values is available at terminals 112 and 113.

A negative input voltage applied at 98 will cause the same result if applied for less than the preset interval of the timer. It will drive the base of 95 negative to initiate conduction and issue a "logical 0" at output 99 while terminating conduction in 92 and issuing a "logical 1" at 103. If the negative voltage is maintained at input 98 beyond the preset interval the circuit will not restore, that is, a "logical 0" will be sustained at output 99. However, at the end of the preset interval even with a negative voltage on 98, transistor 92 will return to conduction and issue a "logical 0" on output 103.

The symbol employed for the timer of FIG. 6 is shown in FIG. 6*a*. It should be noted that timers 189 and 191 of FIG. 9 each employ only input 98 and therefore no input 97 is shown in that drawing. The timing rate can be slowed, as when servicing the system, by placing additional capacitance in parallel with condenser 108. This external capacitance can be connected between leads 99 and 113.

An "or" power amplifier is symbolized in FIG. 7*a* and its schematic is shown in FIG. 7. In essence it comprises the "or" of FIG. 3 followed by two stages of amplification to provide both amplification and a double inversion of the output signal. A "logical 1" signal applied to any of inputs 114, 115 or 116 renders transistor 117 conductive, transistor 118 non-conductive and transistor

119 conductive to issue a "logical 0" with respect to ground at output 120. As in previous circuits the PNP transistors offer a high impedance when on-conductive due to the application of a positive bias to the bases at 121, emitters are connected to a common lead 122, and the collectors are connected to negative sources at 123, e.g., minus 12 volts D.C. and at 124, e.g. minus 24 volts D.C. Conduction of transistor 118 in the quiescent state of the circuit is assured by the voltage divider action of resistors 126, **126*a* and 126*b* developing a negative bias on the base of 118**.

The "nor" amplifier of FIG. 8 comprises an "or" of FIG. 3 followed by one stage of amplification and inversion. In the quiescent state transistor 127 is non-conductive and transistor 128 is conductive to effectively issue a "logical 0" with respect to ground at output 129. When a "logical 1" is applied to any input 131, 132 or 133 transistor 127 becomes conductive, the base of 128 is driven positive to cut off 128, and a "logical 1" is issued at 129. A common emitter connection is provided at 134 and a positive bias is applied to the base of each transistor at 135 as in previous circuits.

A detailed description of the system of reading information from registers, storing that information, recording it, verifying the recording, resetting the registers and verifying the cycle will now be undertaken utilizing the logic symbols of FIGS. 3*a* thru 8*a*. Reference should be had to FIGS. 9 through 12 showing one set of four registers in FIG. 10, instead of the fourteen registers which would be required for reading the panel of FIG. 1 and two memory groups in FIGS. 11 and 12, one for each of the first and second registers illustrated in FIG. 10. It is to be appreciated that a complete system for the panel of FIG. 1 would also include fourteen memory groups, one for each register decade or digit.

Figure 1:
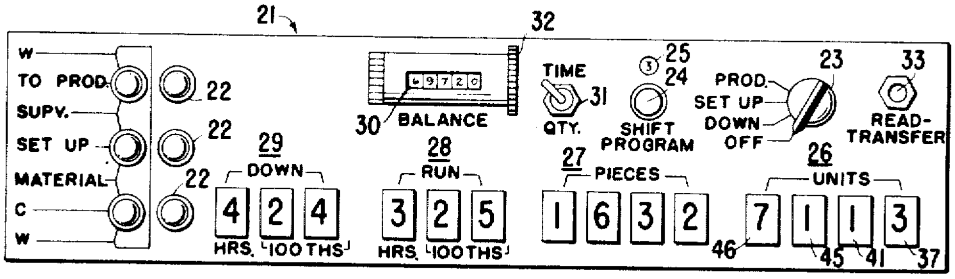
FIG. 1 is a front elevation of a typical central station display panel for a remotely located work station illustrating the information accumulators or registers from which information is read by the method and system of this invention.

FIG. 10 is merely illustrative of one register group, the production unit register 26. The arrowheaded leads extending from the circuits of FIG. 10 extend to additional register groups in the family of registers for a family representing the data accumulated on one central station panel for one work station as shown in FIG. 1. In one utilization of the system, as disclosed in a cofiled application by the present inventors for "Production Monitoring System and Sequencing Control Therefore," it employs multiple memory sets. The terminals lead to these sets through an odd-even relay (not shown) having contacts XFR. One set of XFR back contacts couple the pulse source and memory contacts illustrated, while front contacts XFR are to another set of memory contacts not illustrated. The logic symbols representing from left to right "or" circuits, a pair of "nor" circuits and an "or" amplifier in horizontal alignment with each register solenoid are repeated for each solenoid from which information is to be read. Thus for the panel 21 of FIG. 1 a complete circuit would include in addition to the four units register decades four such circuits for the pieces registers 27, three for the run time register 28, and three for down time register 29. Since the readout, reset and checking functions of the system are performed simultaneously on all registers of a family the control leads 47, 48 and 49 are connected to each register circuit as are the encoding leads 161, 162, 163 and 164 employed in translation between decimal and binary codes.

When inforamtion accumulated in a group of registers is to be recorded, the circuit of FIGS. 9 through 12 is activated as by a program clock or operation of read-transfer switch 33 on panel 21. In the initial read-transfer operation contact 169 is closed to apply a negative going pulse from terminal 170 connected to a suitable source (e.g. −12 volts D.C.) through rectifier 171, limiting resistor 172, coupling condenser 173 and rectifier 174 to input lead 175 of memory 176. This "logical 1" signal turns on that stage of the flip flop which is normally off so that its output lead 177 issues a "logical 0," to transfer lead 177 to a "logical 1" and maintain that signal until a resetting "logical 1" signal is applied to input lead 178. "Not" circuit 179 issues a "logical 0" on output lead 181 in response to the "logical 1" on lead 177. The "logical 0" enables "nor" circuit 182 to issue a "logical 1" to flip flop 183 over lead 184 since all of "nor" inputs 181, 185 and 186 at this time are subject to "logical 0" signals. Flip flop 183 inverts its output signals from a "logical 0" on lead 187 and a "logical 1" on lead 188 and by virtue of the control offered by the time delay introduced by timers 189 and 191 through "nor" circuits 192 and 182 issues a train of square pulses on lead 187.

In the dormant state timer 189 issues a "logical 0" on output lead 193 and a "logical 1" on output lead 194. The imposition of a "logical 1" signal on lead 187 reverses the signal on lead 193 to a "logical 1" and on lead 194 to a "logical 0." However the characteristics of the timer are such that the maintenance of a "logical 1" signal on input 187 for the preset interval of the timer circuit will transfer lead 193 to a "logical 0." As long as a "logical 1" signal appears on either of leads 193 or 194, "nor" circuit 192 will issue a "logical 0" signal on lead 195. Upon the maintenance of the "logical 1" on input 187 for the timed interval, the "nor" circuit 192 will be enabled and issue a "logical 1" to the "off" input 195 of flip flop 183.

Flip flop 183 issues complementary output signals on leads 187 and 188. Thus, in the dormant state, with a "logical 0" applied to "on" input 184 a "logical 0" appears at lead 187 and a "logical 1" appears on lead 188. Application of a "logical 1" at "on" input 184 conditions lead 187 to a "logical 1" and lead 188 to a "logical 0" until flip flop 183 is turned off. Control of flip flop 183 is relinquished by "nor" 182 when lead 188 goes to a "logical 0" and thereby resets timer 191 since lead 185 then issues a "logical 1" and "nor" 182 issues a "logical 0" on lead 184. With a "logical 0" on lead 184, the application of a "logical 1" to "off" input 195 at the end of the interval for timer 189 turns off flip flop 183 causing a "logical 0" at 187 and a "logical 1" on 188.

At the time pulse generation is initiated timer 191 is subject to a "logical 1" signal on lead 188. The retention of this signal for the preset interval of the timer causes a "logical 0" signal to issue on each of output leads 185 and 186. Timer 191 has the same characteristics as timer 189. That is, it issues complementary signals on its outputs 185 and 186 when a "logical 0" is imposed on input 188 so that a "logical 0" appears on 186 and a "logical 1" appears on 185. It also undergoes a reversal of output states when a "logical 1" is initially imposed on input 188, and when that "logical 1" is maintained on input 188 the preset interval of the timer, lead 186 returns to a "logical 0" so that a "logical 0" appears on both outputs.

When timer 189 enables "nor" 192 to issue a "logical 1" on lead 195 to "off" input of flip flop 183, lead 187 receives a "logical 0" to reset timer 189 and discontinue the flip flop reset from "nor" 192, and lead 188 receives a "logical 1" to initiate the timing of timer 191 by causing it to issue a "logical 1" on 186 and a "logical 0" on 185. "Nor" 182 remains disabled until the "logical 1" from 188 is maintained on timer 191 its preset interval whereupon a 'logical 0" is issued on 186 and "nor" 182 again passes a "logical 1" to flip flop memory 183. Memory 183 then generates another "logical 1" signal on 187 and the cycle of operation is repeated. Flip flop 183, timers 189 and 191 and "nor" circuits 192 and 182 as described constitute a pulse generator 196, enclosed by the dashed line in FIG. 9, which is free running so long as a "logical 0" is maintained on lead 181. This cycle repeats until terminated by a "logical 1" reset signal to memory reset 178 at the end of the sixteenth pulse, as will be described.

Consider the train of sixteen pulses on lead 187. These pulses are applied through lead 197 to a binary counter 198 made up of four cascade coupled flip flop stages 199, 201, 202 and 203 provided with suitable sequencing controls to define a ten pulse train. The pulses on 187 also are applied to "or" output amplifier 204 to provide pulses for advancing the register solenoids through their read and reset cycles. Duplicate circuits are shown in FIG. 10 for units, tens, hundred and thousands decades of the production unit register. In order to reduce the description the function of one circuit will be described, however like reference numerals will be applied to each circuit shown and the elements will be distinguished by a suffix letter symbolic of the decade as U for unit, T for tens, H for hundreds and M for thousands.

"Or" amplifier 204 is employed as a "nor" amplifier by connecting its output lead 205 by means of lead 205*a* to a load such as resistor 204*a* and an indicator lamp 204*i* and to a terminal 200 connected to a suitable source, e.g. −12 volts D.C. When a "logical 1" is applied to input 187, current flow from terminal 200 causes a voltage drop across resistor 204*a* and lamp 204*i* so that lead 47 is effectively at a "logical 0." When the "or" amplifier 204 has a "logical 0" input on lead 187, the drop no longer occurs across 204*a* and 204*i* and the source connected to terminal 200 effectively imposes a "logical 1" on lead 47.

In the quiescent state "or" amplifier 204 imposes a "logical 1" on lead 47 which is applied to "nor" circuits 208U, 208T, 208H and 208M. The cycling of pulse generator 196 to impose "logical 0" pulses on lead 47 and inputs 207U, 207T, 207H and 207M is without effect at this time since a "logical 1" signal is maintained on lead 48 and inputs 209U, 209T, 209H and 209M of the "nor" amplifiers to inhibit a "logical 1" output on leads 212U, 212T, 212H and 212M and the "or" amplifiers 213U, 213T, 213H and 213M supplying the register solenoids through leads 214U, 214T, 214H and 214M.

The "logical 1" on lead 205 due to the "logical 0" on lead 187 is applied to "or" amplifier 206. "Or" 206 functions as a "nor" amplifier through a circuit corresponding to that for "or" 204 in that its output is connected through a load comprising resistor 206*a* and lamp 206*i* to terminal 200. As a result the "logical 1" of the "or" output 205 appears as a "logical 0" on lead 49 and vice versa provided no "logical 1" is applied to "or" amplifier input lead 210. Thus, the signals on lead 49 correspond to those from the pulse generator output 187, provided no inhibiting signal is present on lead 209, and are passed by "or" amplifiers 213U, 213T, 213H and 213M over their respective output leads 214 and contacts of transfer relay TR to solenoids 35, 38, 42 and 44.

Indicator lamps 204*i* and 206*i* are primarily intended for trouble shooting. They pass sufficient current to bring them to incandescence when the "or" amplifiers are subject to a "logical 1" input signal and pass a lower level when a "logical 0" input is applied. Thus, lamp 204*i* is not lit when the pulse generator is not issuing "logical 1" and 206*i* is not lit when the "logical 1" is issued. The frequency of the pulse generator is such in normal operations that the changes in level of the lights is imperceptible during normal pulse trains. Accordingly, when it is desirable, the pulse rate of the pulse generator can be reduced by closing switches 180*a* and 180*b* to connect capacitors 190*a* and 190*b* to the timers 189 and 191 whereby their period of operation is extended. Closure of switches 180*a* and 180*b* connect capacitors from the lead corresponding to 113 of FIGS. 7 and 7*a* to that corresponding to lead 99, leads 185 and 194 respectively.

In the readout of the information in the digit registers they are operated through one cycle by applying ten pulses to their driving solenoids. When the readout is initiated, transfer relay TCR (not shown) is energized to open the cascaded coupling of the solenoids of each group and to couple the solenoids to driving "or" amplifiers 213. For example, the units solenoid 35 is coupled to "or" amplifier 213U by closing contact TCR–1 and is separated from production units relay contact 1CR–1 controlled by the microswitch at the work station being monitored, and from the tens solenoid 38 by opening back contact TCR–2. The remaining solenoids of the production units group are connected to their respective "or" amplifiers by closing contacts TCR–3, TCR–5 and TCR–7 and those solenoids are separated from their energizing path from the ninth contact of the preceding decade by opening back contacts TCR–4, TCR–6 and TCR–8 respectively.

During the cycling of the registers through a count of ten, the closure or reclosure, if a display wheel was on 9 at the outset, of the display wheel actuated contact closes or recloses the ninth position switches UU, TU, HU and MU once. This contact closure is employed to set up binary code combinations of relays in accordance with the count in each register by virtue of the coincidence of that closure with the generation of a particular pulse to energize appropriate relays in a group. These contact closures or reclosures are rendered effective upon the encoding memory relays, as depicted in FIGS. 11 and 12 for the units and tens digits of the production units register as code groups CUU and CTU enclosed within the dashed lines, by the closure of transfer relay contacts TCR–9, TCR–10, TCR–11 and TCR–12 each of which is connected through a relay, e.g. W1 and W2 to a separate source and lead 215. Switches UU, TU and HU are isolated from each other by opening transfer relay back contacts TCR–13 and TCR–14 to avoid interaction between code groups during readout. Rectifiers 220, the W relays and the separate source for those relays provided isolation of leads 216, 217 and 218 to avoid sneak circuits through contacts UU, TU and HU and to register solenoids of the several interconnected registers.

Each ninth position switch has its other pole connected to a lead common to the relay code group for the digit that switch represents. The units code group CUU is connected to switch UU by lead 216 and the ten group CTU by lead 217. Since none of the other code groups for the hundreds and thousands digits are shown the switches HU and MU are connected by leads 218 and 219 respectively to terminations which in practice are coupled to the respective code groups in the same manner lead 216 connects to group CUU.

Figure 9:
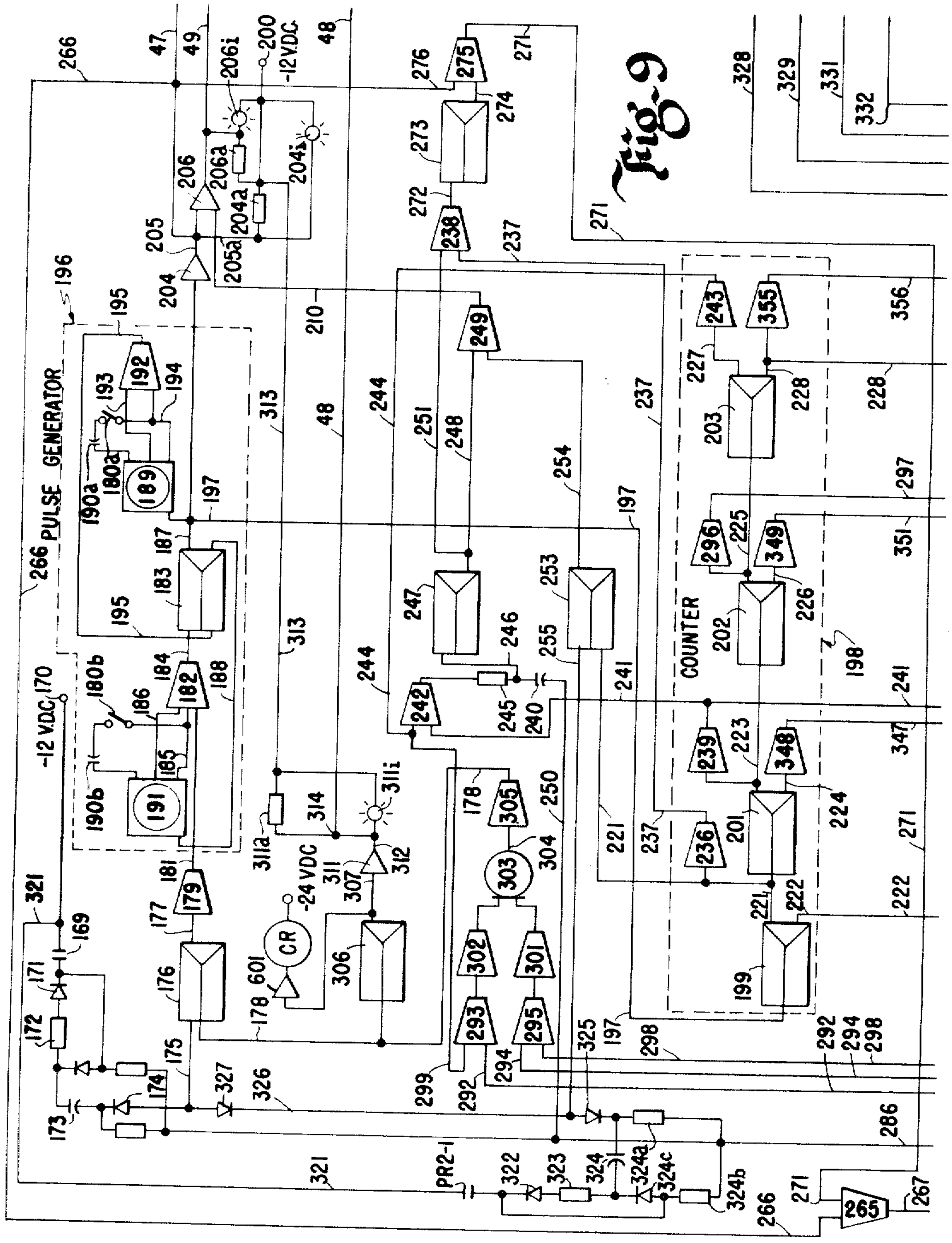

The application of the ten pulse train to the register solenoids is controlled by counter 198 and the sequencing circuits of FIG. 9. Initially the flip flop stages 199, 201, 202 and 203 are in a similar state with their upper right hand terminals issuing "logical 0" and their lower right hand terminals issuing "logical 1." Each is arranged to transfer their conductive and non-conductive stages on the positive going signal terminating each application of a "logical 1" signal (the trailing edge of the negative going pulse) on its input lead. Thus at the end of the first cycle of pulse generator 196 lead 221 transfers from a "logical 0" to a "logical 1" and lead 222 transfers from a "logical 1" to a "logical 0." At the end of the second cycle as lead 221 returns to a "logical 0" lead 223 from flip flop 201 transfers from a "logical 0" to a "logical 1" and lead 224 transfers from a "logical 1" to a "logical 0." Similarly, at the end of the fourth cycle flip flop 202 transfers to issue a "logical 1" on 225 and a "logical 0" on 226 and at the end of the eighth cycle flip flop 203 transfers to issue a "logical 1" on 227 and a "logical 0" on 228. The operation of the stages at their leads 222, 224, 226 and 228 during a sixteen pulse cycle is shown by the fifth through eighth trace of FIG. 15. A conventional binary code is thus developed on the output leads of the flip flop which has sixteen conditions representing sixteen pulses. Appropriate leads from the counter stages are utilized in the sequencing circuits.

Counter 198 responds to the termination of each pulse and therefore its count lags the number of pulses issued by the pulse train by one. The first ten pulses are reflected in counter output during the second through the eleventh pulse and enable the encoding relay groups typified by CUU and CTU only during the second through eleventh pulses as determined by suitable gating circuits. On the end of the tenth pulse of pulse generator 196, flip flop 199 is reset to issue a "logical 0" on lead 221 which is passed to "not" 236 causing a "logical 1" on lead 237 to "nor" 238. The end of the tenth pulse also inverts flip flop 201 to issue a "logical 1" on lead 223 to "not" 239 which issues a "logical 0" on lead 241 to "nor" 242. Flip flop 203 remains inverted during the tenth pulse to issue a "logical 1" on lead 227 to "not" 243 which issues a "logical 0" on lead 244 to "nor" 242. "Nor" 242 issues a "logical 1" through resistor 245 and lead 246 to the "on" input of flip flop 247 to cause its "off" output to issue a "logical 0" on lead 248 to "nor" 249 and on lead 251 to "nor" 238. Since no reset signal is applied to flip flop 247 and it is not reset until the reset of all logic in the system by opening the supply thereto, flip flop 247 maintains the "logical 0" on the leads 248 and 251 between the ends of the tenth and sixteenth pulses. Flip flop 253 issues a "logical 0" on "on" output 254 to "nor" 249 since no "logical 1" signal is applied to its "on" input 255 during the eleventh through sixteenth pulses. Thus, "nor" 249 has "logical 0" signals on both of its inputs to issue a "logical 1" to "or" amplifier 206 input lead 210 so that a "logical 0" is maintained on lead 49 throughout the eleventh through sixteenth pulses of the read cycle and the register solenoids cannot be driven from that lead during that interval.

Condenser 240 between common lead 286 via lead 250, and lead 246 into flip flop 247 insures against a false indication that a count of ten has been achieved. Such an indication can occur if there is an overlap in the transfer of states of the several circuits between the count of "7" and "8." Accordingly, the response of flip flop 247 is delayed a sufficient interval to permit the transfer to be completed by passing the initial signal portion to ground over lead 250.

The "nor" amplifiers 261, 262, 263 and 264 of FIG. 11 driving the memory relays are enabled whenever "nor" 265 issues a "logical 1" as determined by the presence of a "logical 0" on both of its inputs 266 and 271. Input 266 passes a "logic 0" only when the solenoid driving pulse, a "logical 1," is present on lead 49. This avoids a false reading in the encoding of the memory relays due to a transfer of the digit register ninth contact UU, TU, HU or MU. Input 271 passes a "logical 0" coincidentally with the "logical 0" on lead 266 during the second through eleventh read pulses and thereafter locks out the "nor" amplifiers by issuing a "logical 1" whenever lead 266 applies a "logical 0."

The memory relays typified by those inthe family CUU and CTU of FIGS. 11 and 12 are enabled throughout the read cycle of pulses two through eleven during a portion of each pulse cycle in which the registers are not advancing by imposing a "logical 0" signal on inputs 256, 257, 258 and 259 for "nor" amplifiers 261, 262, 263 and 264 driving the group of memory relays and thereafter during pulses twelve through sixteen a "logical 1" is imposed on those inputs to lock out any further relay actuation. Each pulse cycle from the pulse generator includes an interval in which a "logical 1" appears on lead 47 and an interval in which a "logical 0" appears. As described, during the logical 0" signal on lead 47 a "logical 1" appears on lead 49 and the registers are cocked. At the beginning of the "logical 1" signal on lead 47 and of the "logical 0" on 49, they are advanced by the drop of their armatures. The memory relays record the pulse count when their register has closed its ninth position contact. In order to avoid the false reading of the registers during their transfer between the openand closed position of their ninth contact, the memory relay driving circuits are synchronized with the register advance by applying "logical 1" signals from lead 47 to "nor" 265 by lead 266. This causes a "logical 0" to issue on lead 267 to "nots" 268 and 269 and a "logical 1" to be imposed on inputs 256, 257, 258, 259 to block out "nor" amplifiers 261, 262, 263 and 264.

During the second through eleventh pulses the "nor" amplifiers 261, 262, 263 and 264 can pass signals when the "logical 0" is on lead 266 since a "logical 0" is also on lead 271. "Nor" 238 issues a "logical 0" to "on" input 272 of flip flop 273 from the initiation of readout until the eleventh pulse. Thereafter it issues a "logical 1" to transfer the "off" output 274 of flip flop 273 from a "logical 1" to a "logical 0." "Nor" 275 is fed by lead 274 and from lead 47 by lead 276 so that upon the coincidence of "logical 0" signals on these feeds it issues a "logical 1" to lead 271 to lock out "nor" 265 by causing it to continuously issue a "logical 0" until the end of the read cycle.

Energizing circuits for relays of families CUU, CTU and all other families are completed by ninth position contact of the digit register with which they are associated. In the case of the CUU family, contact UU of the units decade of production units register completes an energizing circuit only in response to one pulse cycle of the ten pulse readout train to enable that family. "Nor" amplifier 261, 262, 263 and 264 are arranged to be energized in a binary code to insure a proper recording of the count and proper reset of the counters. The memory relays MR1, MR2, MR3 and MR4 are arranged to pull in the code combinations corresponding to the counter stages. That is, when stage 199 is inverted, relay MR1 can be energized by the "logical 0" on lead 222 enabling "nor" amplifier 261 to pass current through lead 276, rectifier 277, memory relay coil MR1 and Nixie relay coil NR1, retifier 278, contact W1, lead 284, contact PCR–1 and terminal 279 to −24 v. D.C. Relay W1 in FIG. 10 is energized through lead 216, contacts UU and TCR–9, and lead 215, to a suitable source, e.g. −24 volts D.C. separate from that supplying the solenoids. Each "nines" contact, e.g. TU, HU and MU, is similarly relayed through a W relay as W2 for contact TU. Punch card relay PCR maintains contact PCR–1 closed at all times the system is operative except a brief interval following verification of the card punched from the settings established by the memory relays. When PCR–1 is opened, it simultaneously resets all memory relays. This can occur only if the information has been recorded correctly as determined by the verifying equipment in the card punch machine (not shown). When counter stage 201 is inverted relay coils MR2 and NR2 are enabled through lead 281 and "nor" amplifier 262 by the "logical 0" on lead 241. In like manner the inversion of signals in stage 202 will enable relays MR3 and NR3 through lead 282 and "nor" amplifier 263 and in stage 203 will enable relays MR4 and NR4 through lead 283 and "nor" amplifier 264.

Once a memory relay is energized, it seals itself for the remainder of the read-transfer operation for the register group. This seal is established from terminal 279 through contact PCR–1, lead 284, lead 285 in the case of family CUU and seal contacts 1 and 2 of the memory relay to lead 286 and ground. In the case of memory relay MR1, the seal contacts are MR1–1 and MR1–2. The Nixie relays are slaves to the memory relays and serve to set up the reset circuits for the registers so that during the reset pulse train the number of pulses necessary to advance the register display wheels to their zero position can be passed to the solenoids. This is accomplished by the closure of the first contact of the Nixie relays of those which were energized in the seal cycle as contacts NR1–1, NR2–1, NR3–1 and NR4–1.

Each of the family of memory and Nixie relays is provided with a contact matrix converting the binary coded energization of those relays to a ten terminal decimal output. As shown in FIG. 14 for relays MR1, MR2, MR3 and MR4 outputs at terminals zero through nine as indicated on the right side of the figure are represented as ground derived from contact MR1–3 and passed through the matrix in accordance with the energization of one or more of the memory relays. Thus ground is passed to the uppermost terminal, coded for the number seven as set forth within the circle representing the terminal, when relays MR1, MR3 and MR4 are deenergized and relay MR2 is energized by the path from ground through closed back contacts MR1–3, MR3–3, MR4–3 and front contact MR2–3. The terminals are connected to the recording mechanism as by a card punching machine emitter (not shown). Corresponding contacts of the Nixie relays are employed to provide visual indication of the information within each digit memory as by establishing an energizing circuit for Nixie tubes.

It is to be noted that each digit is provided with a memory family and that like relays of each memory family are driven from a common "nor" amplifier and sealed through a common ground. Thus the first memory relay of each family MR1 of FIG. 11, MR5 of FIG. 12, MR9 (not shown), etc., is driven from "nor" 261 over leads 276 and **276*a* and is sealed over lead 286 to place the several relays in parallel. Further each relay of a family is intercoupled by their common connection to the register ninth contact as UU for relays MR1, MR2, MR3 and MR4 and TU for relays MR5, MR6, MR7 and MR8. These interconnections lead to many possible sneak circuits between the relays of different families and the relays within the family which are avoided by the appropriate placing of rectifiers in the circuits. One rectifier for each memory relay is placed between the common feed from the "nor" and the seal circuit to ground as rectifiers 277 and 277*t* between lead 276*a* and seal contacts MR1–1 and MR5–1 respectively to ground lead 286. This avoids shorting the corresponding relays to ground through the common feed connection and the contact of a sealed relay. The other rectifier for each individual memory relay is placed between the seal contact for that relay and the common energizing lead for the other relays of that family which is connected to the digit register ninth contact common to that family. Thus the source at terminal 279 when sealed for a relay as at contact MR1–2 to relay MR1 cannot feed back through lead 216 to any of relays MR2, MR3 or MR4 since rectifier 278** blocks the path to flow in that direction.

A visual indication of the operation of the pulse generator through the read cycle is afforded by indicator lamps 287, 288, 289 and 291 connected in parallel to the pull in circuits for memory relay coils MR1, MR2, MR3 and MR4. These lamps are illuminated in accordance with the binary code developed in counter 198 and only during the pull in portion of each pulse.

In order to facilitate an appreciation of this invention the binary code employed to invert counter stages for count 0 through 16, to enable memory relays for count 0 through 9, and to actuate indicator lamps 287, 288, 289 and 291 for count 0 through 9 is set forth below with respect to the counter stages. Corresponding operation of the memory relays and Nixie type count indicator lamps is apparent. The columns represent the stages of the counter and the horizontal rows the number of the pulse in the pulse train. Coding is indicated as a reset stage by a + and as an inverted stage by a —.

| | Counter Stage 199 | Counter Stage 201 | Counter Stage 202 | Counter Stage 203 |
|---|---|---|---|---|
| 0 | + | + | + | + |
| 1 | — | + | + | + |
| 2 | + | — | + | + |
| 3 | — | — | + | + |
| 4 | + | + | — | + |
| 5 | — | + | — | + |
| 6 | + | — | — | + |
| 7 | — | — | — | + |
| 8 | + | + | + | — |
| 9 | — | + | + | — |
| 10 | + | — | + | — |
| 11 | — | — | + | — |
| 12 | + | + | — | — |
| 13 | — | + | — | — |
| 14 | + | — | — | — |
| 15 | — | — | — | — |
| 16 | + | + | + | + |

In operation, if a units digit of four were registered to be read, ninth position contact UU would be closed on the release of the units register armature at the end of the fifth pulse, i.e., upon the fifth step of the register display wheel during the read cycle. At this time counter stage 199 is inverted to enable "nor" amplifier 261 to pull in relays MR1 and NR1 and to light lamp 287; counter stage 201 is reset to block "nor" amplifier 262; counter stage 202 is inverted to enable "nor" amplifier 263 to pull in relays MR3 and NR3 and to light lamp 289; and counter stage 203 is reset to block "nor" amplifier 264. Actual energization of these relays takes place during the next advance cycle, i.e., the sixth pulse, through the gating action of "nor" 265. During the succeeding pulses, no further relays are energized. By reference to FIG. 14, it will be noted that ground is passed to terminal "four" from closed front contact MR1–3, to closed back contacts MR2–6 and MR4–5, to closed front contact MR3–4 and the terminal coded "four."

Subsequent to the tenth pulse in the read cycle the pulse generator continues pulsing lead 197 and the count advances in counter 198 to a count of fifteen at which all stages are inverted. At the next or sixteenth count all stages are reset and the counter is effectively at zero. The fifteenth count imposes a "logical 0" on lead 222 to lead 292 and one input to "nor" 293; a "logical 0" on lead 241 is passed to lead 294 and "nor" 295; a "logical 1" on lead 225 into "not" 296 produces a "logical 0" on lead 297 which is passed on lead 298 to "nor" 295; and a "logical 0" on lead 244 is passed to lead 299 and "nor" 293. Thus, both "nor" 295 and 293 are enabled to pass "logical 1" signals to "not" 301 and 302 respectively, and both "not" 301 and 302 pass "logical 0" signals to "or" 303. At all other counts at least one of the inputs to "nor" 295 or 293 receives a "logical 1" to cause a "logical 1" to be issued by "or" 303.

At the end of the sixteenth pulse, pulse generator 196 stops pulsing, the pulse lockout on lead 47 releases, and the pulse lockout to lead 49 resets.

The positive going trailing edge of the sixteenth pulse resets all counter stages to terminate the "logical 0" from "or" 303. While "or" 303 issues a "logical 0" on lead 304 to "not" 305, a "logical 1" appears on lead 178 to the "trigger" inputs of flip flops 176 and 306. As noted, "trigger" inputs are responsive only to a positive going signal. Hence the end of the sixteenth pulse causes "or" 303 to issue "logical 1" and results in a transfer to a "logical 0" on lead 178. This transfer inverts conduction in flip flops 176 and 306.

The inversion of flip flop 176 terminates the "read" pulse cycle from pulse generator 196 by imposing a "logical 0" on lead 177.

The inversion of flip flop 306 issues a "logical 1" on lead 307 until another sixteen pulse cycle is completed, at which time it again inverts to a "logical 0" on lead 307. Prior to the beginning of each "read" cycle as determined by the clocking means which actuates contact 169 the flip flop circuits, the timers, "or" amplifiers, and "nor" amplifiers are reset by momentarily opening the circuit supplying the —12 volts D.C. to their terminals as at 76, 76′, 93, 123 and 130 as they appear respectively in FIGS. 4 5, 6, 7 and 8 by means not shown.

The "logical 1" on lead 307 conditions the register reset verification circuit to relay A of FIG. 10 by means of "or" amplifier 601 which controlls relay CR to render relay A1 responsive only during the second or reset pulse train, and releases the lockout signal on lead 48 by transferring it from a "logical 1" to a "logical 0" so that the "nor" circuits 208 of FIG. 10 employed in resetting the register solenoids are partially enabled as at terminals 209U, 209T, 209H and 209M. "Or" amplifier 311 fed by lead 307 functions as a "not" in the same manner as "or" 204 to issue a "logical 0" on lead 47 in response to a "logical 1" on lead 307. The signal on output lead 312 from "or" 311 is applied to the load made up of resistor 311 and lamp 311*i* connected to terminal 200 by lead 313. Thus the drop across the load produces an inversion in the signal from "or" 311 on lead 48 connected at junction 314.

The interval required to cycle pulse generator 196 and counter 198 through a sixteen pulse train is substantially less than that required to cycle the currently employed recording equipment such as card punching equipment (not shown). Therefore, the speed of the read and recording cycles are a function of the speed of the recording equipment and the programming of these cycles by operation of pilot relays PR1 and PR2 is dependent upon the condition of the recording equipment. Relays PR1 and PR2 have functions inverse to XCR and XRC in the cofiled application by the present inventors for "Production Monitoring System and Sequencing Control Therefor." When the preceding recording operation has been completed pilot relay PR2 (not shown) is energized to initiate the reset of the registers.

Operation of pilot relay PR2 closes contact PR2-1 to pass a negative going pulse from the source connected to terminal 170 over lead 321, through rectifier 322, resistor 323, condenser 324, rectifier 325, lead 326 and rectifier 327 to "on" input lead 175 of flip flop memory 176. Resistors 324*a* and 324*b* in conjunction with rectifier 324*c* enable the discharge of condenser 324 to reset the starting circuit shortly after the start signal has been applied on lead 175. The start signal turns on the flip-flop to initiate the sixteen pulse cycle of pulse generator 196.

Pulses for resetting the digit registers are passed by "nors" such as 208U, 208T, 208H, and 208M only when a "logical 0" is applied to all inputs. The reset drive "logical 1" pulses on leads 328, 329, 331 and 332 are developed in counter 198 when all inputs to respective "ors" 334, 337, 338 and 339 of FIG. 11 as derived from the counter are "logical 0." Such pulses are produced by the counter only on the transfer of conduction states as positive going signals are imposed on counter input lead 197 during the recovery of the pulse generator signal from a "logical 1" pulse. Thus the first 'logical 1" pulse from the pulse generator is generated and lost before the counter inverts to open the gate provided by "nors" 208. This lost pulse is supplied by bypassing the "nors" 208 and applying a pulse directly from the lead 49 to the "or" amplifiers 213 supplying each of the register solenoids. As a result, in all cases the reset involves applying at least one pulse. In the case of counts of zero through eight, the registers are reset by applying a number of pulses equal to the complement so that for "zero" ten pulses are applied, for "one" nine pulses are used and so forth. In the case of a count of nine the reset is accomplished by applying eleven pulses to advance the register one full cycle plus one step.

The start signal is also applied from lead 326 to lead 255 to turn on flip flop 253 and cause it to issue a "logical 1" at its output 254 whereby "nor" 249 is disabled and no blocking "logical 1" is imposed on "or" amplifier 206. "Nor" 249 permits only the initiating pulse on lead 187 to be issued by "or" amplifier 206 on lead 49. This initiating pulse supplies the first pulse of the reset train applied to the register solenoids and makes up for the loss of the first pulse in the reset circuits. The initial "logical 1" signal on lead 187 is thus passed to lead 49 and the register solenoids to step the solenoids that step lost due to the requirement of a positive going trigger pulse in the counter stages which is first available only after the first pulse has been completed.

As shown in FIG. 15, a reset pulse train begins at R to produce a train of sixteen negative going pulses on lead 187 each numbered in the horizontal index at the top of the drawing. At the beginning of the train "or" amplifier 206 is enabled as a "nor" until a "logical 1" is applied to its input 210, and thereby produces a "logical 1" on lead 49 in response to the first pulse on lead 187. This supplies the one lost pulse mentioned above and shown in the signal pattern for lead 49 in FIG. 15. Thereafter "or" 206 is cut off in a manner to be described.

"Or" 204 responds to the signal on lead 187 by inverting that signal on lead 47 as shown in the third signal pattern of FIG. 15. Lead 48 issues a "logical 0" throughout the sixteen pulse train as shown in the fourth signal trace of FIG. 15. A coincidence of "logical 0" signals on leads 47, 48 and 211 is required to permit a "logical 1" to issue on lead 212 to the "or" amplifier driving the register solenoid. The signal on lead 211 is ordinarily a "logical 1" but can be inverted to a "logical 0" by a "logical 1" from any of leads 328, 329, 331 and 322 to "or" 341 through Nixie relay contacts NR1-1, NR2-1, NR3-1 or NR4-1 respectively. Thus the memory controlled Nixie relays determine the number of pulses admitted. If NR1 is energized, the second pulse generated will be effective since the "logical 1" on lead 328 as shown in FIGURE 15 will be applied to lead 211U as a "logical 0" during that pulse. In a similar manner lead 329 is capable of applying a "logical 1" during the third and fourth pulses if NR2 is energized, lead 331 is capable of applying a "logical 1" during the fifth through eighth pulses if NR3 is energized and lead 332 applies a "logical 1" during the ninth through sixteenth pulses if NR4 is energized. The composite signal for all relays NR1 to NR4 energized is represented in FIG. 15 with the intervals during which each relay's contacts pass the "logical 1" bracketted.

The ultimate pulse train available to the register solenoid over lead 214 is a composite of the signal on lead 212 and 49 as shown in FIG. 15. The composite enabling signal of lead 211 and the periods for the respective enabling sources to be effective are represented by the brackets as noted.

Each enabling signal on leads 328, 329, 331 and 332 is derived from the counter stages. Accordingly, the "off" output signals for each stage have been shown in FIG. 15 as the signal on lead 222 for stage 199, on lead 224 for stage 201, on lead 226 for stage 202 and on lead 228 for stage 203. While these signals may be inverted through "nor" circuits or their inverted equivalent may be utilized from the "on" output of the stage, it is believed that an understanding of the development of the signals on leads 328, 329, 331 and 332 will be facilitated from a reference to signal traces for 222, 224, 226 and 228. The signal on lead 328 is made up of an enabling signal from 222 and inhibiting signals from 224, 226 and 228. That on lead 329 is made up of an enabling signal from lead 224 and an inhibiting signal from leads 226 and 228. The signal on lead 329 is enabled by the signal on 226 and inhibited by that on 228. Lead 332 signal is enabled by the signal from lead 228.

The remainder of FIG. 15 illustrates the pulse sequences employed to generate the complementary number of resetting pulses on lead 214 for the counts "zero" through "nine" in the register. For example for the digit "three" seven pulses are developed by the one pulse from lead 49, two pulses from lead 329 and closed contact NR2-1, and four pulses from lead 331 and closed contact NR3-1. Contacts NR1-1 and NR4-1 are open for the digit "three" and no pulses are applied during the enabling interval of the signal on leads 328 and 332.

Prior to the initiation of pulsing from pulse generator 196 all stages of counter 198 are reset, a "logical 1" is present on the lead 47 to block "nor" 208U, 208T, 208H and 208M, a "logical 0" is present on lead 48 to permit the "nors" to issue a signal when 48 and 211U, 211T, 211H and 211M have "logical 0" signals. The following discussion will concern the reset of solenoid 35 although it is to be understood that other memory relay groups are also set up by the preceding read cycle and will be subject to the signals on leads 328, 329, 331 and 332 to pulse their register solenoids.

Lead 211U derives its signals from counter 198. In the "zero" count of the counter a "logical 1" is issued on lead 222 to lead 333 and "or" amplifier 334 passes current to produce a "logical 0" on output lead 335. "Or" amplifier 334 functions as "nor" in the manner of "or" amplifiers 204, 206 and 311 in that it is connected through a load comprising resistor 334*a* and an indicator lamp 334*i* to a suitable source, e.g. −12 volts D.C., at terminal 336 so that, when conductive, the drop across the load produces a "logical 0" on lead 328. "Or" amplifiers 337, 338 and 339 are arranged as "or" 334 so that they also issue a "logical 0" on their output leads 329, 331 and 332 respectively, in response to a "logical 1" on any of their inputs. Thus, when the system is quiescent following a read cycle, the "logical 0" on 328 is passed to lead 161 through contact NR1–1 if that relay was energized to "or" 341 and "not" 342. "Not" 342 issues a "logical 1" to "nor" 208U on lead 211U in response to a "logical 0" input and "nor" 208U therefor has a "logical 0" on its feed 212U to "or" amplifier 213U.

Since parallel inputs to "or" 341 are available, if the memory relay for that input is energized to close contact NR2–1, NR–3–1 or NR4–1, the signal on leads 162, 163 and 164 for the quiescent state will also be considered. These signals are each a "logical 0." Counter stage 201 issues a "logical 1" on lead 241 when in its normal state of conduction. This "logical 1" is passed to "or" 337 on lead 343 to apply a "logical 0" to leads 329 and 162. Counter stage 202 when in normal conduction issues a "logical 1" on lead 297 to lead 344 and "or" 338 so that leads 331 and 163 receive a "logical 0." Leads 228 and 346 pass a "logical 1" to "or" 339 when stage 203 is in normal conduction so that leads 332 and 164 have a "logical 0." Thus, in the quiescent state, all reset leads have "logical 0" signals and no stepping impulse is applied to solenoid 35 from the reset driving circuits.

The first "logical 1" pulse on lead 187 energizes solenoid 35 in the same manner as during the read cycle since a permissive "logical 0" is on lead 210 to "or" 206. This applies the "logical 1" to lead 49, "or" 213U, lead 214U, transfer relay contact TCR–1 and solenoid 35.

At the end of the first "logical 1" pulse on lead 187, conduction in stage 199 is inverted to issue a "logical 0" on leads 222 and 333. This produces a "logical 1" on leads 228 and 161 which is passed to "or" 341 if contact NR1–1 is closed. "Not" 342 issues a "logical 0" in response to a "logical 1" from "or" 341. At this time "nor" 208U is disabled by a "logical 1" on lead 207U from lead 47, since lead 187 issues a "logical 0" which is inverted to a "logical 1" by "or" 204.

The first inversion in conduction of stage 199 also inhibits further transmission of pulses on lead 49 to "or" amplifier 213U and solenoid 35. The signal on lead 221 is transferred from a "logical 0" to a "logical 1," thereby resetting flip flop 253 so that the "logical 1" on its output lead 254 due to the initiating reset pulse on 255 is transferred to a "logical 0." "Nor" 249 thereafter issues a "logical 1" on lead 210 to inhibit signals on lead 49.

The leading edge of the second "logical 1" pulse on lead 187 as shown at T of FIG. 15 has no effect upon stage 199 since that stage is transferred only in response to the trailing edge of a "logical 1" pulse (the positive going signal). During this "logical 1" pulse, "or" 204 issues a "logical 0" signal on leads 47 and 207U so that all inputs to "nor" 208U are "logical 0" in the assumed state and a second pulse is applied to solenoid 35 until the lead 47 is returned to a "logical 1" by the next "logical 0" on lead 187.

As the pulse generator 196 returns to a "logical 0" after the second pulse, stage 199 transfers and again issues a "logical 1" from lead 222 to produce a "logical 0" on leads 328 and 161. Stage 201 transfers to issue a "logical 0" on lead 224 which is converted to a "logical 1" on lead 347 by "not" 348, and "or" 334 issues a "logical 1" to leads 328 and 161. During all portions of the sixteen code cycle except that following the first pulse at least one input lead to "or" 334 receives a "logical 1" and a "logical 0" appears on lead 328 and 161 so that the only resetting pulse available to the solenoids from those leads is during the "logical 1" from pulse generator 196 following the first pulse cycle. This will be appreciated from a consideration of the table set forth above and from FIG. 15 wherein at least one of stages 201, 202 and 203 is inverted from normal conduction for each of counts 2 through 15. Thus, when stage 201 is inverted, lead 347 issues a "logical 1" to "or" 334. When stage 202 is inverted, lead 226 issues a "logical 0" to "not" 349 producing a "logical 1" on leads 351 and 352 to "or" 353 and lead 354 into "or" 334. When stage 203 is inverted, lead 228 issues a "logical 0" to "not" 355 which passes a "logical 1" to leads 356 and 357, "or" 353 and lead 354 into "or" 334.

"Or" 337 issues a "logical 1" to leads 329 and 162 only during the third and fourth "logical 1" pulses in the sixteen pulse resetting train. Hence, if contact NR2–1 is closed, solenoid 35 will receive two pulses from "or" 337 during the resetting cycle. "Logical 0" signals will coincide on all input leads to "or" 337 only for the third and fourth pulses. Following the second pulse, stage 201 causes a "logical 0" on leads 241 and 343 to "or" 337 and during the first and second pulses it applied a "logical 1." During the fifth through eighth pulses stage 202 imposes a "logical 1" on lead 351 to "or" 337 and during the ninth through sixteenth pulses, lead 356 passes a "logical 1" from "not" 355 and stage 203 to "or" 337. The third and fourth pulses each establish coincident "logical 0" signals on each of input leads 343, 351 and 356 to "or" 337 since stage 201 is inverted and stages 202 and 203 are in normal conduction.

"Or" 338 permits four stepping pulses for the register solenoids during the fifth, sixth, seventh and eighth pulses of the reset cycle. During the first four pulses, stage 202 is in normal conduction to issue a "logical 1" on leads 297 and 344 to "or" 338. During the ninth through sixteenth pulses stage 203 is inverted to issue a "logical 1" on lead 356 to "or" 338. However, during the fifth through eighth pulses, stage 202 is inverted and stage 203 is normal so that "logical 0" signals appear at each of leads 356 and 344 to "or" 338 so that four pulses of "logical 1" are passed to leads 331 and 163. If contact NR3–1 is closed by the memory relay coding, "or" 341 and solenoid 35 receive four pulses.

"Or" 339 permits eight stepping pulses to the register solenoids during the ninth through sixteenth pulses in the pulse train of the reset cycle. Eight pulses are applied to leads 332 and 164 by "or" 339 and if contact NR4–1 is closed are passed by "or" 341, "not" 342, "nor" 208U and "or" 213U.

Each of the fourteen registers of the group from which counts are to be read, stored, and recorded is provided with a contact actuated by the position of the register display wheel so that it is open only when the register is at its zero position. These normally closed zero contacts are employed in a verification circuit shown in FIG. 10. They have been designated in a manner similar to their counterparts, the ninth position contacts UU, TU, HU and MU, in that the prefix V has been applied to signify the verification function; the second letter U for units, T for tens, H for hundreds and M for thousands applies to the decade of the digit of the individual registers; and the suffix U for production units, P for pieces, D for down time, and R for production or run time indicates the register family functions. When the count accumulated in a system is to be read and read-transfer relay TCR is energized, contact TCR–13 is closed to connect the fourteen paralleled zero contacts to a verification circuit including an alarm relay A and a reset-conditioned contacts CR and PR2–2. The alarm relay can be arranged to actuate an audible and/or visual alarm and/or lock up the system so that further errors will not be made. It is actuated by the failure of one or more of the zero contacts of the registers to be opened at the end of the reset cycle as determined by the closure of reset contacts CR and PR2–2.

In the card punch machine storage mechanism to which this system has been supplied, a dual verification of the system functions is achieved by retaining the memory and Nixie relays energized in their encoding combinations until the last card to record the information has been punched and verified against the punch machine settings. If the first card is not verified by the machine the machine is stopped, an alarm can be actuated, and the clocking signals for the present system are withheld so that the system stops. Multiple cards may be produced with the same production data recorded. The reset of the registers is begun as soon as the first card to be punched with the data is verified. The reset cycle is enabled by the punch card machine operating relay PR2. Only after the system has responded to the closure of contact PR2–1 and the reset cycle is completed is the verification circuit of FIG. 10 effective to ascertain that all registers, all memory and Nixie relays and the counter functioned properly to return all registers to their "zero" position and open their verification contacts.

The transfer control relay TCR for a panel which is read by this system is dropped following the reset of the registers (by controls not shown). The operation of the transfer control relay TCR either on its pull-in prior to the initiation of the "read" cycle or its dropout at the termination of the reset of the registers can conveniently be employed as the means actuating the reset of those circuits providing memory functions by momentarily opening the supply designated as a delayed −12 volt D.C. as at lead 76 of FIG. 4, 76' of FIG. 5, 93 of FIG. 6, 123 of FIG. 7, and 130 of FIG. 8. The system is thus reset to be utilized in another read, store, record and reset cycle.

The system functions to perform a method of reading one or a plurality of digit registers by advancing the registers through a complete cycle so that they are returned to their original setting representative of the information accumulated therein. During this recycling the point at which the registers pass a given condition, as the nine count in the example, is marked and the amount of advance between the original setting and the marked condition is measured. This measurement is in the form of a pulse count in the example. This measured value is then translated or encoded, as by the memory and Nixie relays, to represent the information accumulated in the register, as on an illuminated display or by the actuation of punch magnets in a card punching machine which records the information. The measured advance in the example has been made from advance initiation to the marked condition; however, since the measured value is translated it might as readily be from the marked condition to the end of the advance cycle since that end condition is correlated with the condition at initiation of the cycle.

The reading and storage of accumulated information in a plurality of registers can be accomplished with high speed since all registers are advanced simultaneously. The reading and storage functions for the plural registers can be considered to occur simultaneously in that they all are subject to the measurement during the advance. Some measurements extend beyond others in duration but an overlap of measurements occurs to expedite the process and it is in this sense that the operation is termed "simultaneously."

Reset of one or a plurality of registers is accomplished by establishing the amount of advance to which a register must be subjected to place it in a desired reset condition as determined from the measurement effected as described above for a read cycle. In the example, the reset value was "zero"; hence, the advance was the remainder of a register cycle to "zero" from the point at which the register stopped after being recycled. This reset function for a plurality of registers can be accomplished simultaneously in that all registers are driven to their reset by a single advancing sequence. As employed herein it is recognized that with the pulse driven reset some registers may be subjected to an advancing pulse while others are not. However, but one pulse train is required to reset all registers and in this sense resetting is simultaneous.

The readout of the registers and the reset is verified in the method of this invention by sensing the condition of the register following the reset cycle. If the proper readout occurred, the proper reset signal will be generated and the register will advance to its reset value, "zero" in the example. If a malfunction occurred, the register will receive a reset signal of either insufficient or excessive value and will not be returned to its reset condition. Similarly, in a plural register readout and reset all registers must be at their reset value following reset or a malfunction is indicated and no verification will be obtained.

While the invention has been illustrated as applied to electromagnetically driven digit registers, utilizing an electrical pulse generator, electrical pulse counters and electrical sequencing circuits, it is to be appreciated that the method can be applied to mechanically driven registers, even when driven by hand, and that the marking functions, measuring functions and translating functions can be performed by other than electrical circuit means including mechanical controls established automatically or even by hand. Accordingly, it is to be understood that the above-described embodiment is set forth merely as illustrative and is not to be read in a limiting sense.

Having described the invention, we claim:

1. Apparatus for reading information accumulated in a digit register having a given digit cycle and for resetting said register comprising, means for advancing said register through a complete digit cycle, means for measuring the amount of advance required to condition said register to a predetermined state, means for translating said measured amount of advance to information characteristic of that accumulated in said register and reset means responsive to said measured amount of advance to apply an advancing signal to said register of a value which is a function of said measured advance.

2. Apparatus for resetting a plurality of digit registers each having a given digit cycle comprising, means for advancing said registers through a complete digit cycle, means for each register for marking the presence of a predetermined state in said register, means for each register for measuring the advance of the register between the state representing information accumulated therein and said predetermined state and means for each register for advancing said register an amount determined by said measured advance of said register to establish a predetermined reset value therein, said means advancing a plurality of registers simultaneously.

3. A combination according to claim 2 including a reset marking means for each register responsive to the conditioning thereof to said predetermined reset value, and reset verification means responsive to the coincident response of all reset marking means.

4. Apparatus for resetting a register having a given digit cycle comprising, an electrical pulse generator, means for advancing said register a step in response to each pulse from said generator, said pulse generator issuing sufficient pulses to said advancing means to advance said register through said given digit cycle, means marking the advance of said register to a predetermined digit, means counting the pulses utilized in advancing said register between a digit accumulated therein and said predetermined digit and means applying advancing pulses to said register in accordance with the counted pulses to advance said register from said digit accumulated therein the advance indicated by said count to be required from the digit of said count to a given reset value.

5. Apparatus for resetting a register having a given digit cycle comprising, an electrical pulse generator, means for applying advancing impulses to said register in response to pulses from said generator to advance said register through said given digit cycle, means marking the advance of said register to a predetermined digit, means counting the pulses utilized in advancing said register between a digit accumulated therein and said predetermined digit, a coder, a plurality of outputs for said coder, said coder being responsive to said pulse generator to issue a predetermined number of reset pulses on each of a plurality of said outputs, and means responsive to the pulse count measured by said pulse counting means for coupling selected coder outputs to said register to apply a total number of pulses to said register required to advance said register from the digit accumulated therein to a given reset value.

6. Apparatus for resetting a register having a given digit cycle comprising, an electrical pulse generator, means for applying advancing impulses to said register in response to pulses from said generator, said pulse generator issuing sufficient pulses to said advancing means to advance said register through said given digit cycle, means marking the advance of said register to a predetermined digit, means counting the pulses to advance said register between a digit accumulated therein and said predetermined digit, gating means responsive to the generation of pulses sufficient to advance said register through said given digit cycle, and means enabled by said gating means for applying advancing pulses to said register in accordance with the counted pulses to advance said register from said digit accumulated therein to a given reset value.

7. Apparatus for resetting a plurality of registers having a given digit cycle comprising, an electrical pulse generator, means for each register simultaneously effective for advancing said registers a step in response to each pulse from said generator, said generator issuing sufficient pulses to said advancing means to advance said registers through said given digit cycle, means for each register for marking the advance of said register to a predetermined digit, means counting said pulses, means for each register for storing the pulse count coincident with the response of said marking means for said register, and means applying resetting pulses to each of said registers simultaneously, the number of said resetting pulses for each register being that required to advance said register to a given reset state as determined by the stored pulse count for said register.

8. A combination according to claim 7 including a reset marking means for each register responsive to the conditioning thereof to said reset state, and reset verification means responsive to the coincident response of all reset marking means.

9. Apparatus for reading, storing, recording and verifying the storage of information accumulated in a plurality of digit registers each having an individual electromagnetic drive and each having a ten digit cycle comprising, a generator of electrical pulses of a form causing the advance in the registers of one digit position per pulse, a binary counter for said pulses, means responsive to said pulse generator for applying advancing pulses to said register drive for each register, a gate between said pulse generator and said pulse applying means responsive to said counter to pass ten pulses to said means, means for marking a given digit in each register when said register is advanced to said digit, a binary coded memory for each register energized in response to said marking means to establish the count of the counter at the time said marking means is actuated, a recorder responsive to said memory for recording the digit characteristic of the memory count of registers subsequent to the application of the ten digit cycle to the registers, means responsive to the completion of recording to apply a reset pulse train to said counter, a coder, a plurality of outputs for said coder, said coder being responsive to said counter to issue a predetermined number of reset pulses on each of a plurality of said outputs, means responsive to said memory for each register for coupling selected outputs to said register in accordance with the number of pulses required to advance said register from the count established in said memory to zero, means for marking the zero condition in each register, and verification means responsive to the coincident operation of all zero marking means for all registers.

10. A system for reading, storing, recording and verifying the storage of information accumulated in a plurality of digit registers each having a ten digit cycle which comprises, means for advancing each of said registers simultaneously through ten digit steps, marking means for each register responsive to the advance of said registers to a predetermined reference digit, counting means responsive according to the number of steps required to advance each register from the digit to be read to the reference digit of said marking means, means for translating the response of said counting means to the information to be read for each register, means responsive to said translating means for storing said translated information, means responsive to said storing means for recording the translated information for each register following completion of the ten digit advance cycle, means responsive to said storage means for translating for the stored information for each register a resetting signal comprising the number of steps required respectively to advance each register from its stored digit to its zero digit, means responsive to said reset signal translator for applying said advancing steps to each register in accordance with its respective resetting signal, and means responsive to the setting of all registers at their zero digits for verifying the reading and storage of all the digits read in said registers.

11. A system for reading, storing and recording the storage of information accumulated in a plurality of digit registers each having a given digit cycle and of resetting said registers which comprises, means for advancing each of said registers simultaneously through a complete digit cycle, marking means for each register responsive to the advance of said registers to a predetermined reference digit, counting means responsive according to the number of steps required to advance each register from the digit to be read to the reference digit of said marking means, means for translating the response of said counting means to the information to be read for each register, means responsive to said translating means for storing said translated information, means responsive to said storing means for recording the translated information for each register following completion of said advance cycle, means responsive to said storage means for translating for the stored information for each register a resetting signal comprising the number of steps required respectively to advance each register from its stored digit to a predetermined digit from which it is to accumulate further information, and means responsive to said reset signal translator for applying said advancing steps to each register in accordance with its respective resetting signal.

12. A system for reading, and storing the information accumulated in a plurality of digit registers each having a given digit cycle and of resetting said registers which comprises, means for advancing each of said registers simultaneously through a complete digit cycle, marking means for each register responsive to the advance of said registers to a predetermined reference digit, counting means responsive according to the number of steps required to advance each register from the digit to be read to said reference digit of said marking means, means for translating the response of said counting means to the information to be read for each register, means responsive to said translating means for storing said translated information, means responsive to said storage means for translating for the stored information for each register a resetting signal comprising the number of steps required respectively to advance each register from its stored digit to a predetermined digit from which it is to accumulate further information, and means responsive to said reset signal translator for applying said advancing steps to each register in accordance with its respective resetting signal.

13. A system for resetting a plurality of digit registers each having a given digit cycle which comprises, means for advancing each of said registers simultaneously through a complete digit cycle, marking means for each register responsive to the advance of said registers to a predetermined reference digit, counting means responsive according to the number of steps required to advance each register from the digit to be read to said reference digit of said marking means, means responsive to said count of said counting means for each register for translating for the count for each register a resetting signal comprising the number of steps required respectively to advance each register from its counted digit to a predetermined digit from which it is to accumulate further information, and means responsive to said reset signal translator for applying said advancing steps to each register in accordance with its respective resetting signal.

14. A combination according to claim 13, including a reset marking means for each register responsive to the setting of said register to the reset state, and means responsive following the advance of said registers by their resetting signals to the coincident response of all reset marking means for said registers.

15. A combination according to claim 13 wherein said resetting signals are applied simultaneously to said respective registers.

16. A system for reading and resetting a digit register to the information to be read for said register, means readvancing said register through a complete digit cycle, marking means for said register responsive to the advance of said register to a predetermined reference digit, counting means responsive according to the number of steps required to advance said register from the digit to be read to said reference digit of said marking means, means for translating the response of said counting means to the information to be read for said register, means responsive to said counting means for translating for the count for said register a resetting signal comprising the number of steps required to advance said register from its counted digit to a predetermined digit from which it is to accumulate further information, and means responsive to said reset signal translator for applying said advancing steps to said register in accordance with its resetting signal.

17. A combination according to claim 16 including a reset marking means for said register responsive to the setting of said register to the reset state, and means to verify the count of said counting means when said resetting signal has been applied to said register responsive to the response of said reset marking means.

18. A system for resetting a digit register having a given digit cycle which comprises, means for reading the digit setting of said register, means responsive to said reading means for translating for the read information for said register a resetting signal comprising the number of steps required respectively to advance said register from its read digit to a predetermined digit, and means responsive to said reset signal translator for applying said advancing steps to said register in accordance with its resetting signal.

19. A combination according to claim 18 including a reset marking means for said register responsive to the setting of said register to the reset state, and means to verify the count of said counting means when said resetting signal has been applied to said register responsive to the response of said reset marking means.

20. A system for resetting a plurality of digit registers each having a given digit cycle which comprises, means for reading the digit setting of each of said registers, means responsive to said reading means for translating for the read information for each register a resetting signal comprising the number of steps required respectively to advance each register from its read digit to a predetermined digit, and means responsive to said reset signal translator for applying said advancing steps to each register in accordance with its respective resetting signal.

21. A combination according to claim 20 including a reset marking means for each register responsive to the setting of said register to the reset state, and means responsive following the advance of said registers by their resetting signals to the coincident response of all reset marking means for said register.

References Cited

UNITED STATES PATENTS

| | | | |
|---|---|---|---|
| 2,936,954 | 5/1960 | Raymond | 235—132 |
| 3,120,606 | 2/1964 | Eckert et al. | 235—160 |

OTHER REFERENCES

M. V. Wilkes: Automatic Digital Computers, N.Y., John Wiley, 1957, p. 26.

ROBERT C. BAILEY, *Primary Examiner.*

O. E. TODD, P. J. HENON, *Assistant Examiners.*